(12) United States Patent
Gotou et al.

(10) Patent No.: US 9,085,706 B2
(45) Date of Patent: *Jul. 21, 2015

(54) INKJET INK, INK CARTRIDGE, INKJET RECORDING METHOD, INKJET RECORDING DEVICE, AND INKJET RECORDED MATTER

(75) Inventors: Hiroshi Gotou, Kanagawa (JP); Kiyofumi Nagai, Tokyo (JP); Michihiko Namba, Kanagawa (JP); Hidetoshi Fujii, Kanagawa (JP); Yuuki Yokohama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 54 days.

This patent is subject to a terminal disclaimer.

(21) Appl. No.: 13/810,917

(22) PCT Filed: Jul. 29, 2011

(86) PCT No.: PCT/JP2011/067906
§ 371 (c)(1),
(2), (4) Date: Jan. 18, 2013

(87) PCT Pub. No.: WO2012/018098
PCT Pub. Date: Feb. 9, 2012

(65) Prior Publication Data
US 2013/0113860 A1      May 9, 2013

(30) Foreign Application Priority Data

Aug. 4, 2010    (JP) ................. 2010-175585

(51) Int. Cl.
*C09D 11/30* (2014.01)
*C09D 11/322* (2014.01)
*C09D 11/38* (2014.01)

(52) U.S. Cl.
CPC .............. *C09D 11/38* (2013.01); *C09D 11/322* (2013.01)

(58) Field of Classification Search
CPC ....... C09D 11/30; C09D 11/322; C09D 11/38
USPC ...................... 106/31.43, 31.58, 31.75, 31.86
See application file for complete search history.

(56) References Cited

U.S. PATENT DOCUMENTS 3,889,269 A    6/1975   Meyer et al.
3,914,303 A    10/1975  Daniher et al.
(Continued)

FOREIGN PATENT DOCUMENTS

CN    1662381 A    8/2005
CN    1820059 A    8/2006
(Continued)

OTHER PUBLICATIONS

English translation of JP 2010/168433; Aug. 2010.*
(Continued)

*Primary Examiner* — Helene Klemanski
(74) *Attorney, Agent, or Firm* — Oblon, McClelland, Maier & Neustadt, L.L.P.

(57) ABSTRACT

To provide an inkjet ink, which contains: water; a wetting agent; a surfactant; and a colorant, wherein the wetting agent contains at least an amide compound represented by the following structural formula (I):

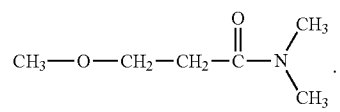

18 Claims, 8 Drawing Sheets

(56) References Cited

U.S. PATENT DOCUMENTS

| | | |
|---|---|---|
| 4,647,310 A | 3/1987 | Shimada et al. |
| 4,711,668 A | 12/1987 | Shimada et al. |
| 4,793,860 A | 12/1988 | Murakami et al. |
| 5,431,720 A | 7/1995 | Nagai et al. |
| 5,462,592 A | 10/1995 | Murakami et al. |
| 5,514,208 A | 5/1996 | Nagai et al. |
| 5,622,550 A | 4/1997 | Konishi et al. |
| 5,810,915 A | 9/1998 | Nagai et al. |
| 5,879,439 A | 3/1999 | Nagai et al. |
| 5,882,390 A | 3/1999 | Nagai et al. |
| 5,972,082 A | 10/1999 | Koyano et al. |
| 5,993,524 A | 11/1999 | Nagai et al. |
| 6,120,589 A | 9/2000 | Bannai et al. |
| 6,231,652 B1 | 5/2001 | Koyano et al. |
| 6,261,349 B1 | 7/2001 | Nagai et al. |
| 6,613,136 B1 | 9/2003 | Arita et al. |
| 6,688,737 B2 | 2/2004 | Nagai et al. |
| 6,918,662 B2 | 7/2005 | Arita et al. |
| 7,094,813 B2 | 8/2006 | Namba et al. |
| 7,278,726 B2 | 10/2007 | Nagai |
| 7,284,851 B2 | 10/2007 | Bannai et al. |
| 7,370,952 B2 | 5/2008 | Inoue et al. |
| 7,682,011 B2 | 3/2010 | Namba et al. |
| 7,699,457 B2 | 4/2010 | Namba et al. |
| 7,810,919 B2 | 10/2010 | Kojima et al. |
| 7,812,068 B2 | 10/2010 | Habashi et al. |
| 7,892,340 B2 | 2/2011 | Namba et al. |
| 7,919,544 B2 | 4/2011 | Matsuyama et al. |
| 7,938,527 B2 | 5/2011 | Ohshima et al. |
| 7,950,793 B2 | 5/2011 | Aruga et al. |
| 8,721,034 B2 * | 5/2014 | Yokohama et al. ............. 347/20 |
| 8,778,071 B2 * | 7/2014 | Matsuyama et al. ....... 106/31.43 |
| 8,845,800 B2 * | 9/2014 | Gotou et al. ............... 106/31.43 |
| 2002/0083866 A1 | 7/2002 | Arita et al. |
| 2002/0096085 A1 | 7/2002 | Gotoh et al. |
| 2003/0010252 A1 | 1/2003 | Arita et al. |
| 2003/0038869 A1 | 2/2003 | Kaneko et al. |
| 2003/0064206 A1 | 4/2003 | Koyano et al. |
| 2003/0107632 A1 | 6/2003 | Arita et al. |
| 2005/0007431 A1 | 1/2005 | Koyano et al. |
| 2005/0168552 A1 | 8/2005 | Arita et al. |
| 2005/0200905 A1 | 9/2005 | Kimura |
| 2005/0268816 A1 | 12/2005 | Lee et al. |
| 2006/0176349 A1 | 8/2006 | Nagai et al. |
| 2007/0197685 A1 | 8/2007 | Aruga et al. |
| 2008/0139706 A1 | 6/2008 | Kaji et al. |
| 2008/0233363 A1 | 9/2008 | Goto |
| 2008/0254228 A1 | 10/2008 | Kojima et al. |
| 2008/0273045 A1 | 11/2008 | Morohoshi et al. |
| 2008/0302268 A1 | 12/2008 | Arita et al. |
| 2009/0041940 A1 | 2/2009 | Yokohama et al. |
| 2009/0047431 A1 | 2/2009 | Hatada et al. |
| 2009/0098312 A1 | 4/2009 | Goto et al. |
| 2009/0114121 A1 | 5/2009 | Morohoshi et al. |
| 2009/0130313 A1 | 5/2009 | Ohshima et al. |
| 2009/0162569 A1 | 6/2009 | Morohoshi et al. |
| 2009/0176070 A1 | 7/2009 | Goto et al. |
| 2009/0186162 A1 | 7/2009 | Namba et al. |
| 2009/0233059 A1 | 9/2009 | Ota et al. |
| 2009/0239044 A1 | 9/2009 | Habashi et al. |
| 2009/0258196 A1 | 10/2009 | Nagashima et al. |
| 2009/0263632 A1 | 10/2009 | Kojima et al. |
| 2009/0291213 A1 | 11/2009 | Ohshima et al. |
| 2010/0076223 A1 | 3/2010 | Shiraki et al. |
| 2010/0112219 A1 | 5/2010 | Yokohama et al. |
| 2010/0196601 A1 | 8/2010 | Goto et al. |
| 2010/0196602 A1 | 8/2010 | Koyano et al. |
| 2010/0196603 A1 | 8/2010 | Ohshima et al. |
| 2010/0196673 A1 | 8/2010 | Nagashima et al. |
| 2010/0209611 A1 | 8/2010 | Ohshima et al. |
| 2010/0215855 A1 | 8/2010 | Morohoshi et al. |
| 2010/0245416 A1 | 9/2010 | Ohshima et al. |
| 2010/0271435 A1 | 10/2010 | Kojima et al. |
| 2010/0277541 A1 | 11/2010 | Watanabe et al. |
| 2010/0279035 A1 | 11/2010 | Namba et al. |
| 2010/0295891 A1 | 11/2010 | Goto et al. |
| 2010/0302326 A1 | 12/2010 | Morohoshi et al. |
| 2011/0057981 A1 | 3/2011 | Aruga et al. |
| 2011/0092610 A1 | 4/2011 | Habashi et al. |
| 2011/0216123 A1 | 9/2011 | Tamai et al. |
| 2011/0251430 A1 | 10/2011 | Shiraki et al. |
| 2011/0292114 A1 * | 12/2011 | Sao et al. .................. 106/31.58 |
| 2012/0207983 A1 * | 8/2012 | Matsuyama et al. ....... 106/31.43 |
| 2013/0002776 A1 * | 1/2013 | Nagashima et al. .......... 347/100 |
| 2013/0065028 A1 * | 3/2013 | Fujii et al. ................. 428/195.1 |
| 2013/0071637 A1 * | 3/2013 | Matsuyama et al. .......... 428/207 |
| 2013/0155145 A1 * | 6/2013 | Gotou et al. ..................... 347/21 |
| 2013/0176369 A1 * | 7/2013 | Gotou et al. ................... 347/100 |
| 2013/0194343 A1 * | 8/2013 | Yokohama et al. .............. 347/20 |
| 2013/0194344 A1 * | 8/2013 | Yokohama et al. .............. 347/20 |
| 2013/0323474 A1 * | 12/2013 | Gotou et al. ................. 428/195.1 |
| 2014/0002539 A1 * | 1/2014 | Goto et al. .................. 106/31.75 |

FOREIGN PATENT DOCUMENTS

| | | |
|---|---|---|
| JP | 49-066623 | 6/1974 |
| JP | 49-097620 | 9/1974 |
| JP | 6-171072 A | 6/1994 |
| JP | 2000-355159 A | 12/2000 |
| JP | 2002-337449 | 11/2002 |
| JP | 2004-250353 | 9/2004 |
| JP | 2005-008735 | 1/2005 |
| JP | 2005-344120 | 12/2005 |
| JP | 2006-016412 | 1/2006 |
| JP | 2009-019198 | 1/2009 |
| JP | 2009-235387 | 10/2009 |
| JP | 2010/168433 * | 8/2010 |
| WO | WO2008/102615 | 8/2008 |
| WO | WO2010/067589 | 6/2010 |

OTHER PUBLICATIONS

U.S. Appl. No. 13/755,257, filed Jan. 31, 2013, Tamai, et al.
Combined Chinese Office Action and Search Report issued Nov. 13, 2013 in Patent Application No. 201180038251.3 with English Translation.
International Search Report Issued Oct. 18, 2011 in PCT/JP2011/067906 Filed Jul. 29, 2011.
U.S. Appl. No. 08/638,636, filed Apr. 26, 1996, Nagai, et al.

* cited by examiner

INKJET INK, INK CARTRIDGE, INKJET RECORDING METHOD, INKJET RECORDING DEVICE, AND INKJET RECORDED MATTER

TECHNICAL FIELD

The present invention relates to an inkjet ink, as well as an ink cartridge, inkjet recording method, inkjet recording device, and inkjet recorded matter using the inkjet ink.

BACKGROUND ART

Conventionally, dye inks were in the main stream as inkjet inks because of their excellent coloring ability and high reliability. However, as the dye inks have disadvantages such as poor water resistance and poor light resistance, pigment inks have been attracted more attentions in these days. In the pigment ink, a polymer compound is used for stably dispersing a pigment in water, or for fixing the pigment onto recording media after depositing the ink thereon.

Meanwhile, inkjet recording devices have their trends that diameters of nozzles serving as an ink ejecting unit have been getting smaller for achieving high image quality and high speed printing. However, the pigment ink containing the polymer compound tends to cause aggregations of its solids content as the moisture evaporates, and it is difficult to secure jetting stability of the ink when the ink is used in the inkjet recording device having the nozzle of a small diameter. To solve this problem, various attempts have been made for improving the jetting stability of the pigment ink containing the polymer compound.

For example, there is disclosed in PTL 1 that an ink has a viscosity change of 10 times or less when the ink is concentrated to have a doubled concentration. In accordance with this proposal, the disclosed ink has excellent jetting stability, and suppresses spreading of the ink because of the aggregation of the pigment when it is used to print on an inkjet printing paper, as well as preventing generating white missing spots in a resulting image. However, the ink specifically disclosed as the ink having the viscosity change of 10 times or less when the ink is concentrated to have a doubled concentration has a low pigment concentration, and low viscosity. Even such the ink is used for printing on plain paper, it is difficult to achieve to provide high quality images. Moreover, there is no teaching, PTL 1, about a method for preventing increase in the viscosity of the ink having a high concentration of the pigment when the moisture is evaporated.

Moreover, PTL 2 discloses an ink which has a viscosity increase rate (mPa·s/%) of 5.0 or less with the moisture evaporation when the moisture evaporation amount is up to 30% by mass relative to the total weight of the ink, and the viscosity increase rate of more than 50 when the moisture evaporation amount is 30% by mass to 45% by mass. It is disclosed that with this proposed ink high quality images are provided by high speed printing as the ink dramatically increases its viscosity when it is deposited on plain paper. However, the proposed ink has a problem that the jetting stability of the ink decreases if the ink is dried in a nozzle of an inkjet recording device.

Furthermore, PTL 3 discloses an ink containing hydroxyethylformamide for securing low viscosity and desirable jetting stability of the ink. However, hydroxyethylformamide contained in the proposed ink generates formamide when decomposed, and there are problems in safety (e.g. mutagenesis and genotoxicity) to human bodies.

As described above, it has been considered that it is necessary to use an ink the viscosity of which dramatically increases along with the evaporation of the moisture for forming high quality images on plain paper by high speed printing, but it is the current situation that it is difficult to secure the reliability of such the ink, and is difficult to utilize the ink. Especially in terms of the jetting stability, aggregations and drying of the pigment adjacent to the nozzle opening is a big problem. To solve this problem, various ink materials have been developed, but it is the current situation that it is still difficult to achieve both low viscosity of the ink and reduction of a solvent evaporation of the ink (drying adjacent to the nozzle opening).

CITATION LIST

Patent Literature

PTL 1 Japanese Patent Application Laid-Open (JP-A) No. 2002-337449
PTL 2 JP-A No. 2006-16412
PTL 3 JP-A No. 49-97620

SUMMARY OF INVENTION

Technical Problem

The present invention aims to provide an inkjet ink that is excellent in image quality on plain paper, and response to high-speed printing, has desirable storage stability and jetting stability, and give less load to a maintenance device of an inkjet recording device, as well as providing an ink cartridge, inkjet recording device, inkjet recording method, and inkjet recorded matter using the inkjet ink as mentioned.

Solution to Problem

The means for solving the aforementioned problems are as follows:

<1> An inkjet ink, containing:
water;
a wetting agent;
a surfactant; and
a colorant,
wherein the wetting agent contains at least an amide compound represented by the following structural formula (I):

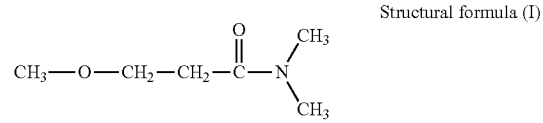

Structural formula (I)

<2> The inkjet ink according to <1>, wherein an amount of the amide compound represented by the structural formula (I) in the inkjet ink is 1% by mass to 50% by mass.
<3> The inkjet ink according to any of <1> or <2>, wherein the wetting agent contains at least one polyhydric alcohol having an equilibrium moisture content of 30% by mass or more at 23° C., and 80% RH.
<4> The inkjet ink according to <3>, wherein the polyhydric alcohol is glycerin, 1,3-butanediol, or both glycerin and 1,3-butanediol.

<5> The inkjet ink according to any one of <1> to <4>, wherein the colorant contains:
 a pigment having at least one hydrophilic group on a surface thereof and having water dispersiblity without a dispersant;
 a pigment dispersion containing a pigment, a pigment dispersant, and a polymeric dispersion stabilizer; or
 a polymer emulsion containing polymer particles each containing a pigment therein.
<6> The inkjet ink according to any one of <1> to <5>, further containing a penetrating agent which contains a C8-C11 polyol compound or a C8-C11 glycol ether compound.
<7> The inkjet ink according to <6>, wherein the C8-C11 polyol compound is 2-ethyl-1,3-hexanediol, or 2,2,4-trimethyl-1,3-pentanediol.
<8> The inkjet ink according to any one of <1> to <7>, wherein the inkjet ink has viscosity of 3 mPa·s to 20 mPa·s at 25° C., static surface tension of 35 mN/m or less at 25° C., and pH of 8.5 or higher.
<9> The inkjet ink according to any one of <1> to <8>, wherein the inkjet ink is at least one selected from the group consisting of a cyan ink, a magenta ink, a yellow ink, and a black ink.
<10> An ink cartridge, containing:
 a container; and
 the inkjet ink as defined in any one of <1> to <9>, housed in the container.
<11> An inkjet recording method, containing:
 applying stimuli to the inkjet ink as defined in any one of <1> to <9> to make the inkjet ink jet to thereby record an image.
<12> An inkjet recording device, containing:
 an ink jet unit configured to apply stimuli to the inkjet ink as defined in any one of <1> to <9> to make the inkjet ink jet to thereby record an image.
<13> Inkjet recorded matter, containing:
 a recording medium; and
 an image recorded with the inkjet ink as defined in any one of <1> to <9> on the recording medium.

Advantageous Effects of Invention

The present invention solves the various problems in the art and achieves the object mentioned above, and can provide an inkjet ink that is excellent in image quality on plain paper, and response to high-speed printing, has desirable storage stability and jetting stability, and give less load to a maintenance device of an inkjet recording device, as well as providing an ink cartridge, inkjet recording device, inkjet recording method, and inkjet recorded matter using the inkjet ink as mentioned.

Figure 1:
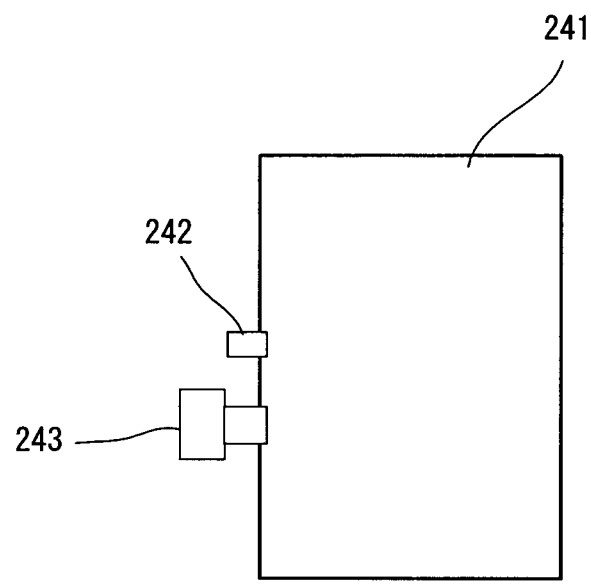
FIG. 1 is a schematic diagram illustrating one example of an ink cartridge of the present invention.

DESCRIPTION OF EMBODIMENTS (Inkjet Ink)
The inkjet ink of the present invention contains at least water, a wetting agent, and a coloring, and may further contain a penetrating agent, a water-dispersible resin, and other components, if necessary.
<Water>
As the water, pure water or ultrapure water, such as ion-exchanged water, ultrafiltered water, Milli-Q water, and distilled water, can be used.
An amount of the water in the inkjet ink is preferably 20% by mass to 60% by mass.
<Wetting Agent>
The wetting agent contains at least an amide compound represented by the following structural formula (I), and if necessary, the wetting agents described below are preferably used in a mixture.

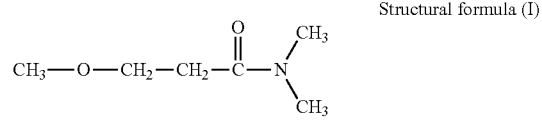

Structural formula (I)

The amide compound represented by the structural formula (I) has a high boiling point that is 216° C., a high equilibrium moisture content in the environment of 23° C., 80% RH, which is 39.2% by mass, and moreover has very low fluid viscosity in the environment of 25° C., which is 1.48 mPa·s. In addition, the amide compound represented by the structural formula (I) easily dissolves to the wetting agent and water. Therefore, use of the amide compound represented by the structural formula (I) enables to produce an inkjet ink of low viscosity, and for this reason the amide compound represented by the structural formula (I) is particularly preferable as a wetting agent for use in an inkjet ink. The inkjet ink containing the amide compound represented by the structural formula (I) is an ink that is excellent in storage stability and jetting stability, as well as giving a less load to a maintenance device of an ejecting device.
The amide compound represented by the structural formula (I) for use in the invention may be appropriately synthesized, or selected from commercial products.
The amide compound represented by the structural formula (I) (β-methoxy-N,N-dimethylpropioneamide) can be synthesized in the following manner.
Specifically, a 500 mL three necked flask equipped with a stirrer, a thermocouple, and a nitrogen-inlet tube is charged with 198.0 g (2 mol) of N,N-dimethylacrylamide and 96 g (3 mol) of methanol.
To this, 20 mL of a methanol solution containing 1.08 g (0.02 mol) of sodium methoxide while introducing nitrogen gas, and stirring at room temperature. The temperature of the solution gradually increases, and the reaction temperature reaches 38° C., 30 minutes after the start of the reaction. The reaction temperature is controlled to the range of 30° C. to 40° C. using a water bath. Five hours later, the heat evolution of the reaction solution is stopped, and the reaction solution is neutralized with acetic acid. After removing unreacted products by distillation, a generated product is obtained by the distillation at 133 Pa, 58° C. As a result of an analysis of nuclear magnetic resonance spectrum ($^1$H-NMR and $^{13}$C-NMR), this product is found to be β-methoxy-N,N-dimethylpropioneamide, and the yield thereof is 199 g (yield: 76%). In accordance with the synthesis method as mentioned, the amide compound represented by the structural formula (I) can be synthesized.

Examples of the commercial products include EQUAMIDE M-100 manufactured by Idemitsu Kosan Co., Ltd.

An amount of the amide compound represented by the structural formula (I) in the inkjet ink is preferably 1% by mass to 50% by mass, more preferably 2% by mass to 40% by mass, and even more preferably 5% by mass to 30% by mass. When the amount thereof is less than 1% by mass, the amide compound does not give an effect of reducing viscosity of the resulting ink, lowering ejecting stability of the resulting ink, and which may lead to a severe situation in terms of depositions of the waste ink in a maintenance device of an ink jetting device. When the amount thereof is more than 50% by mass, the resulting ink has poor drying ability on paper, which may lower a print quality on plain paper.

A wetting agent used in combination with the amide compound represented by the structural formula (I) contains at least one polyhydric alcohol having the equilibrium moisture content (EMC) of 30% by mass or more in the environment of 23° C., and 80% RH. For example, the wetting agent preferably contain a wetting agent A having the high equilibrium moisture content and high boiling point (equilibrium moisture content (EMC) in the environment of 23° C., 80% RH being 30% by mass or more, preferably 40% by mass or more, the boiling point (BP) of 250° C. or higher), and a wetting agent B having the high equilibrium moisture content but low boiling point (equilibrium moisture content (EMC) in the environment of 23° C., 80% RH being 30% by mass or more, the boiling point (BP) of 140° C. to 250° C.).

Among the polyhydric alcohol, examples of the wetting agent A having the boiling point of 250° C. or higher under the normal pressure include: 1,2,3-butanetriol (BP: 175° C./33 hPa, EMC: 38% by mass), 1,2,4-butanetriol (BP: 190° C. to 191° C./24 hPa, EMC: 41% by mass), glycerin (BP: 290° C., EMC: 49% by mass), diglycerin (BP: 270° C./20 hPa, EMC: 38% by mass), triethylene glycol (BP: 285° C., EMC: 39% by mass), and tetraethylene glycol (BP: 324° C. to 330° C., EMC: 37% by mass). Examples of the wetting gent B having the boiling point of 140° C. to 250° C. include diethylene glycol (BP: 245° C., EMC: 43% by mass), and 1,3-butanediol (BP: 203° C. to 204° C., EMC: 35% by mass).

These wetting agents A and B are both highly hygroscopic materials having an equilibrium moisture content of 30% by mass or higher in the environment of 23° C., 80% RH, but it is also true that the wetting agent B is relatively more evaporative than the wetting agent A.

The wetting agent A is particularly preferably the one selected from the group consisting of glycerin, and 1,3-butanediol.

In the case where the wetting agent A and the wetting agent B are used in combination, a mass ratio of the wetting agent A and the wetting agent B (wetting agent B/wetting agent A) is not particularly defined as it depends, to a certain extent, on an amount of a wetting agent C, which will be described later, and amounts and types of other additives for use, such as a penetrating agent, but for example it is preferably 10/90 to 90/10.

In the present invention, the equilibrium moisture content can be obtained by storing a Petri dish in which 1 g of each wetting agent is weight and placed in a desiccator in which the temperature and humidity are maintained at 23° C.±1° C., and 80% RH±3% RH, respectively, using a saturated aqueous solution of potassium chloride/sodium chloride until any change in mass is not observed, and calculating based on the following equation:

$$\mathrm{EMC}_{(\mathrm{wt}\ \%)} = \frac{\text{Amount of moisture absorbed by organic solvent}}{\text{Amount of organic solvent} + \text{Amount of moisture absorbed by organic solvent}} \times 100 \quad <\text{Equitation 1}>$$

Use of the polyhydric alcohol in an amount of 50% by mass or more relative to the total amount of the wetting agent is excellent in terms of jetting stability, and prevention of waste ink depositions in a maintenance device of an ink jetting device.

In the inkjet ink of the present invention, other than the wetting agents A and B mentioned above, other wetting agents, i.e. a wetting agent C, may be used instead of or in addition to the wetting agents A and B. For example, the wetting agent C is typically the one having an equilibrium moisture content of less than 30% by mass in the environment of 23° C., 80% RH.

Examples of the wetting agent C include polyhydric alcohols, polyhydric alcohol alkyl ethers, polyhydric alcohol aryl ethers, nitrogen-containing heterocyclic compounds, amides, amines, sulfur-containing compounds, propylene carbonate, ethylene carbonate, and other wetting agents.

Examples of the polyhydric alcohols include dipropylene glycol (BP: 232° C.), 1,5-pentanediol (BP: 242° C.), 3-methyl-1,3-butanediol (BP: 203° C.), propylene glycol (BP: 187° C.), 2-methyl-2,4-pentanediol (BP: 197° C.), ethylene glycol (BP: 196° C. to 198° C.), tripropylene glycol (BP: 267° C.), hexylene glycol (BP: 197° C.), polyethylene glycol (viscous fluid to solid), polypropylene glycol (BP: 187° C.), 1,6-hexanediol (BP: 253° C. to 260° C.), 1,2,6-hexanetriol (BP: 178° C.), trimethylol ethane (solid, mp: 199° C. to 201° C.), and trimethylol propane (solid, mp: 61° C.).

Examples of the polyhydric alcohol alkyl ethers include ethylene glycol monoethyl ether (BP: 135° C.), ethylene glycol monobutyl ether (BP: 171° C.), diethylene glycol monomethyl ether (BP: 194° C.), diethylene glycol monoethyl ether (BP: 197° C.), diethylene glycol monobutyl ether (BP: 231° C.), ethylene glycol mono-2-ethylhexyl ether (BP: 229° C.), and propylene glycol monoethyl ether (BP: 132° C.).

Examples of the polyhydric alcohol aryl ethers include ethylene glycol monophenyl ether (BP: 237° C.), and ethylene glycol monobenzyl ether.

Examples of the nitrogen-containing heterocyclic compounds include 2-pyrrolidone (BP: 250° C., mp: 25.5° C., 47% by mass to 48% by mass), N-methyl-2-pyrrolidone (BP: 202° C.), 1,3-dimethyl-2-imidazolidinone BP: 226° C.), ε-caprolactam (BP: 270° C.), and γ-butyrolactone (BP: 204° C. to 205° C.).

Examples of the amides include formamide (BP: 210° C.), N-methylformamide (BP: 199° C. to 201° C.), N,N-dimethylformamide (BP: 153° C.), and N,N-diethylformamide (BP: 176° C. to 177° C.).

Examples of the amines include monoethanol amine (BP: 170° C.), diethanol amine (BP: 268° C.), triethanol amine (BP: 360° C.), N,N-dimethylmonoethanol amine (BP: 139° C.), N-methyldiethanol amine (BP: 243° C.), N-methylethanol amine (BP: 159° C.), N-phenylethanol amine (BP: 282° C. to 287° C.), and 3-aminopropyldiethyl amine (BP: 169° C.).

Examples of the sulfur-containing compounds include dimethyl sulfoxide (BP: 139° C.), sulfolane (BP: 285° C.), and thiodiglycol (BP: 282° C.).

As other solid wetting agents, saccharides are preferable.

Examples of the saccharides include monosaccharides, disaccharides, oligosaccharides (including trisaccharides, and tetrasaccharides), and polysaccharides.

Specific examples thereof include glucose, mannose, fructose, ribose, xylose, arabinose, galactose, maltose, cellobiose, lactose, sucrose, trahalose, and maltotriose.

Here, "polysaccharide" means sugar in a broad sense, and include compounds widely present in the nature, such as α-cyclodextrin, and cellulose.

Moreover, examples of derivatives of these saccharides include reducing sugars (e.g. sugar alcohol represented by the general formula: $HOCH_2(CHOH)_nCH_2OH$ (n is an integer of 2 to 5)), sugar acids (e.g. aldonic acid, and uronic acid), amino acids, and thio acids.

Among them, sugar alcohol is particularly preferable, and specific examples thereof include maltitol, and sorbitol.

A mass ratio of the pigment and the wetting agent largely influences on the ink jetting stability from a head, as well as influencing on prevention of waste ink depositions in a maintenance device of an ink jetting device.

In the case where the ink has high solid content of the pigment but having a small formulated amount of the wetting agent, moisture evaporates adjacent to an ink meniscus of a nozzle, causing jetting failures.

An amount of the wetting agent for use, including the amide compound expressed by the structural formula (I) and the wetting agents A, B, and C is preferably 20% by mass to 70% by mass, more preferably 30% by mass to 60% by mass relative to the total amount of the inkjet ink.

When the amount of the wetting agent is less than 30% by mass, the resulting ink has significantly deteriorated properties, i.e. lowered jetting stability and depositions of a waste ink in a maintenance device. When the amount of the wetting agent is more than 70% by mass, the resulting inkjet ink has extremely high viscosity, and therefore it is very difficult to jet such the ink by means of an ink jetting device. In addition, such the ink has poor drying properties on paper, lowering a quality of characters recorded on plain paper.

To improve an image quality of recorded images on plain paper, it is preferred that a wetting agent as other than polyhydric alcohol having an equilibrium moisture content of 30% by mass or more, a wetting agent C1 having a boiling point of lower than 240° C. and an equilibrium moisture content of less than 30% by mass be added in an appropriate proportion. The wetting agent C1 is a wetting agent having an equilibrium moisture content of less than 30% by mass in the environment of 23° C., 80% RH, and a boiling point of lower than 240° C., among the wetting agent C.

An amount of the wetting agent (the amide compound, wetting agent A, wetting agent B, wetting agent C, or wetting agent C1) for use is preferably less than 60% by mass relative to the total amount of the wetting agent in terms of jetting stability and prevention of waste ink depositions in a maintenance device of an ink jetting device.

<Colorant>

In a first embodiment, the colorant is a pigment having at least one hydrophilic group on a surface thereof, and being water dispersible without a dispersant (this pigment may also be referred to as "self-dispersible pigment" hereinafter).

In a second embodiment, the colorant is a polymer emulsion in which a pigment is contained in each polymer particle.

In a third embodiment, the colorant is a pigment dispersion containing a pigment, a pigment dispersant, and a polymeric dispersion stabilizer, where the polymeric dispersion stabilizer is at least one selected from the group consisting of an α-olefin-maleic anhydride copolymer represented by the following structural formula (II), a styrene-(meth)acryl copolymer, a water soluble polyurethane resin, and a water-soluble polyester resin.

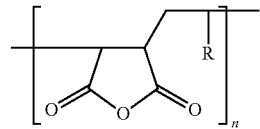

Structural Formula (II)

In the structural formula (II), R denotes a C8-C24 alkyl group, and n is an integer of 10 to 70.

—Pigment—

As the pigment, an organic pigment or inorganic pigment may be used. Note that, a dye may be used in combination with the pigment for the purpose of adjusting a color tone, provided that it does not impair the weather resistance of the resulting ink.

Examples of the inorganic pigment include titanium oxide, iron oxide, calcium carbonate, barium sulfate, aluminum hydroxide, barium yellow, cadmium red, chrome yellow, and carbon black. Among them, carbon black is particularly preferable. Examples of the carbon black include those produced by conventional methods known in the art, such as a contact method, a furnace method, and a thermal method.

Examples of the organic pigment include an azo pigment, a polycyclic pigment, a dye chelate, a nitro pigment, a nitroso pigment, and aniline black. Among them, the azo pigment and the polycyclic pigment are preferable. Examples of the azo pigment include azo lake, an insoluble azo pigment, a condensed azo pigment, and a chelate azo pigment. Examples of the polycyclic pigment include phthalocyanine pigment, a perylene pigment, a perinone pigment, an anthraquinone pigment, a quinacridon pigment, a dioxazine pigment, an indigo pigment, a thioindigo pigment, an iso-indolinone pigment, and a quinophtharone pigment. Examples of the dye chelate include basic dye chelate, and acid dye chelate.

A color of the colorant is appropriately selected depending on the intended purpose without any restriction, and examples thereof include colorants for black, and colorants for colors. These may be used independently, or in combination.

Examples of the colorant for black include: carbon black (C.I. PIGMENT BLACK 7) such as furnace black, lamp black, acetylene black, and channel black; metals such as copper, iron (C.I. PIGMENT BLACK 11), and titanium oxide; and organic pigments such as aniline black (C.I. PIGMENT BLACK 1).

Examples of the colorants for color include: C.I. PIGMENT YELLOW 1, 3, 12, 13, 14, 17, 24, 34, 35, 37, 42 (yellow oxide), 53, 55, 74, 81, 83, 95, 97, 98, 100, 101, 104, 408, 109, 110, 117, 120, 128, 138, 150, 151, 153, and 183; C.I. PIGMENT ORANGE 5, 13, 16, 17, 36, 43, and 51; C.I. PIGMENT RED 1, 2, 3, 5, 17, 22, 23, 31, 38, 48:2, 48:2 (permanent red 2B(Ca)), 48:3, 48:4, 49:1, 52:2, 53:1, 57:1 (brilliant carmine 6B), 60:1, 63:1, 63:2, 64:1, 81, 83, 88, 101 (red ocher), 104, 105, 106, 108 (cadmium red), 112, 114, 122 (quinacridon magenta), 123, 146, 149, 166, 168, 170, 172, 177, 178, 179, 185, 190, 193, 209, and 219; C.I. PIGMENT VIOLET 1 (rhodamine lake), 3, 5:1, 16, 19, 23, and 38; C.I. PIGMENT BLUE 1, 2, 15 (phthalocyanine blue), 15:1, 15:2, 15:3 (phthalocyanine blue), 16, 17:1, 56, 60, 63; and C.I. PIGMENT GREEN 1, 4, 7, 8, 10, 17, 18, and 36.

The self-dispersible pigment of the first embodiment is a pigment each surface of particles of which is modified by bonding at least one hydrophilic group directly or via other atomic group to the surface thereof. As a method for this surface modification, a method in which a predetermined functional group (a functional group such as a sulfone group, carboxyl group, and the like) is chemically bonded to the surface of each particle of the pigment, or a wet oxidation process using hypohalous acid or a salt thereof is used. Among these methods, a method in which a carboxyl group is bonded to a surface of each particle of a pigment, and the pigment is then dispersed in water is particularly preferable. By bonding the carboxyl group to a surface of each particle of the pigment, dispersion stability of the pigment improves, high quality images can be provided by the resulting ink, and water resistance of a recording medium after recording improves.

Moreover, as the ink containing the self-dispersible pigment of the first embodiment has excellent re-dispersibility after being dried, and thus it does not cause clogging of an nozzle of a recording device even when moisture of the ink filled in the nozzle is evaporated, and excellent printing can be easily performed after a simple cleaning operation.

The volume average particle diameter ($D_{50}$) of the self-dispersible pigment in the ink is preferably 0.01 μm to 0.16 μm.

For example, as the self-dispersible carbon black, ionic self-dispersible carbon black is preferable, and those anionicly or cationicly charged are suitable.

Examples of the anionic hydrophilic group include —COOM, —$SO_3$M, —$PO_3$HM, —$PO_3M_2$, —$SO_2NH_2$, and —$SO_2$NHCOR (where M denotes a hydrogen atom, alkali metal, ammonium, or organic ammonium; and R is a C1-C12 alkyl group, a substituted or unsubstituted phenyl group, or a substituted or unsubstituted naphthyl group.). Among them, a color pigment onto a surface of which —COOM, or —$SO_3$M is bonded is preferably used.

Moreover, examples of "M" in the hydrophilic group include lithium, sodium, and potassium. Examples of the organic ammonium include mono-, di-, or trimethyl ammonium, mono-, di-, or trimethyl ammonium, and mono-, di-, or trimethanol ammonium. As the method for obtaining the anionicly charged color pigment, a method for introducing —COONa is introduced to each surface of color pigment particles is used, and examples of such the method include a method in which a color pigment is subjected to oxidation treatment with sodium hypochlorite, a method by sulfonation of a color pigment, and a method in which a color pigment is allowed to react with diazonium salt.

As the cationic hydrophilic group, for example, a quaternary ammonium group is preferable, and the following quaternary ammonium groups are more preferable. In the present invention, a pigment to a surface of which any of the following quaternary ammonium groups is bonded is suitably used as the colorant.

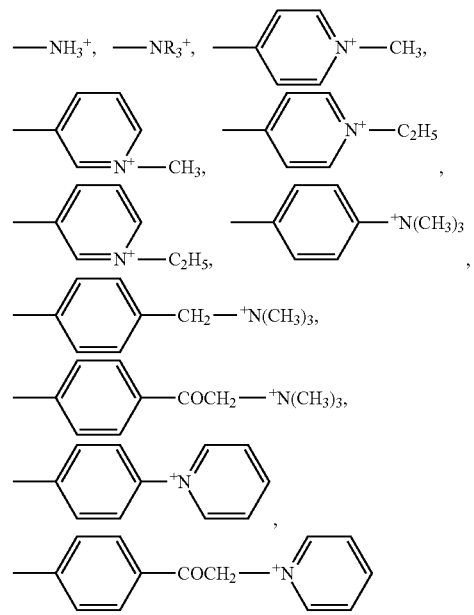

A method for producing a cationic self-dispersible carbon black to which the hydrophilic group is bonded is appropriately selected depending on the intended purpose without any restriction. For example, as a method for bonding the N-ethyl pyridyl group represented by the following structural formula, there is a method in which a carbon black is treated with 3-amino-N-ethylpyridium bromide.

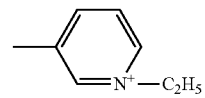

The hydrophilic group may be bonded to the surface of the carbon black via another atomic group. Examples of another atomic group include a C1-C12 alkyl group, a substituted or unsubstituted phenyl group, and a substituted or unsubstituted naphthyl group. Specific examples of the case where the hydrophilic group is bonded to the surface of the carbon black via another atomic group include: —$C_2H_4$COOM (M is an alkali metal or quaternary ammonium), -Ph$SO_3$M (Ph is a phenyl group, and M is an alkali metal or quaternary ammonium), and —$C_5H_{10}NH_3^+$.

As the colorant of the second embodiment, a polymer emulsion in which a pigment is contained in each polymer particle can be used in addition to the pigment mentioned above. The polymer emulsion in which the pigment is contained in each polymer particle includes an emulsion in which a pigment is encapsulated in each polymer particle, and an emulsion in which a pigment is adsorbed on a surface of each polymer particle. In this case, it is not necessary that all of the particles of the pigment be encapsulated or adsorbed, and some particles of the pigment may be dispersed in the emulsion, provided that they adversely affect the obtainable effect of the present invention. Examples of the polymer for forming the polymer emulsion include a vinyl-based polymer, a polyester-based polymer, and a polyurethane-based polymer. The vinyl-based polymer, and the polyester-based polymer are particularly preferably used, and those polymers disclosed in JP-A Nos. 2000-53897, and 2001-139849 can be used.

Moreover, a composite pigment, in which commonly known organic or inorganic pigment particles are each coated with an organic pigment or carbon black, may be suitably used as the colorant. The composite pigment can be obtained by a method for precipitating an organic pigment under the presence of inorganic pigment particles, and a mechanochemical method in which an inorganic pigment and an organic pigment are mechanically mixed and ground. In this case, a layer of an organosiloxane compound formed from polysiloxane or alkyl silane may be optionally provided between the inorganic pigment and the organic pigment to improve the adhesion between layers of these pigments.

Examples of the organic pigment for a black pigment include aniline black, and examples of the organic pigment for a color pigment include anthraquinone, phthalocyanine blue, phthalocyanine green, diazo, monoazo, pyranthrone, perylene, heterocyclic yellow, quinacridon, and (thio)indigoid. Among them, carbon black, a phthalocyanine-based pigment, a quinacridon-based pigment, a monoazo yellow-based pigment, disazo yellow-based pigment, and a heterocyclic yellow pigment are particularly excellent in terms of coloring abilities.

Typical examples of the phthalocyanine blue include copper phthalocyanine blue and derivatives thereof (C.I. PIGMENT BLUE 15:3, 15:4), and aluminum phthalocyanine. Examples of the quinacridon include C.I. PIGMENT ORANGE 48, C.I. PIGMENT ORANGE 49, C.I. PIGMENT RED 122, C.I. PIGMENT RED 192, C.I. PIGMENT RED 202, C.I. PIGMENT RED 206, C.I. PIGMENT RED 207, C.I. PIGMENT RED 209, C.I. PIGMENT VIOLET 19, and C.I. PIGMENT VIOLET 42. Typical examples of the monoazo yellow include C.I. PIGMENT YELLOW 74, C.I. PIGMENT YELLOW 109, C.I. PIGMENT YELLOW 128, and C.I. PIGMENT YELLOW 151. Typical examples of the disazo yellow include C.I. PIGMENT YELLOW 14, C.I. PIGMENT YELLOW 16, and C.I. PIGMENT YELLOW 17. Typical examples of the heterocyclic yellow include C.I. PIGMENT YELLOW 117, and C.I. PIGMENT YELLOW 138. Other suitable color pigments are those disclosed in The Color Index, third edition (The Society of Dyers and Colourists, 1982).

The inorganic pigment include, for example, titanium dioxide, silica, alumina, iron oxide, iron hydroxide, tin oxide, and the like, but those having a small aspect ratio of particles are preferable, and those having spherical shaped particles are particularly preferable. In the case where the color colorant is absorbed on the inorganic pigment, a color of the inorganic pigment is preferably clear or white. The color of the inorganic pigment may be black in the case where the black colorant is adsorbed on the surface of the inorganic pigment. The particle diameters of the inorganic pigment particles are preferably 100 nm or smaller, more preferably 5 nm to 50 nm.

A mass ratio of the inorganic pigment particles to the organic pigment or carbon black serving as the colorant is preferable 3:1 to 1:3, more preferably 3:2 to 1:2. When the mass of the colorant is small relative to that of the inorganic pigment, the coloring ability or dying properties of the resulting ink may reduce. When the mass thereof is large relative to that of the inorganic pigment, a transparency or color tone of the resulting ink may be not desirable.

As the colorant particles in which the inorganic pigment particles coated with the organic pigment or carbon black, a silica-carbon black composite material, a silica-phthalocyanine PB 15:3 composite material, a silica-diazo yellow composite material, and a silica-quinacridon PR122 composite material, which are manufactured by TODA KOGYO CORPORATION, are suitably used because these material have the small average primary particle diameters.

In the case where the organic pigment particles having primary particle diameters of 20 nm are each coated with an equal amount of an organic pigment, a primary particle diameter of a resulting coated pigment will be approximately 25 nm. By dispersing this coating pigment into the size of the primary particle diameter thereof using an appropriate dispersant, a pigment dispersion ink having very fine dispersion particle diameter of 25 nm can be prepared. Since not only the organic pigment present at the surface of the composite material contributes to the dispersion, but also the characteristics of the inorganic pigment come through a thin layer of the organic pigment having a thickness of about 2.5 nm at the time of the dispersion, it is important to select a pigment dispersant that can stabilize the dispersed state of the composite material under consideration of the characteristics of both the organic pigment and the inorganic pigment.

The colorant of the third embodiment is a pigment dispersion element containing the inorganic pigment, the organic pigment, the composite pigment, and the pigment dispersant, and a polymeric dispersion stabilizer, where the polymeric dispersion stabilizer is preferably at least one selected from the group consisting of an α-olefin-maleic anhydride copolymer represented by the following structural formula (II), a styrene-(meth)acryl copolymer, a water-soluble polyurethane resin, and a water-soluble polyester resin.

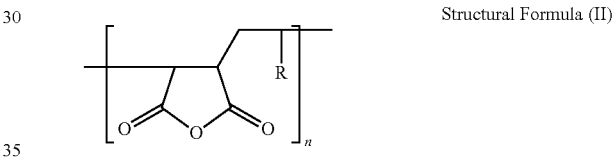

Structural Formula (II)

In the structural formula (II), R denotes a C8-C24 alkyl group, and n is 10 to 70.

The polymeric dispersion stabilizer is an effective material for stably maintaining the dispersion state of the pigment dispersion elements that are finely dispersed in water with assistance of the pigment dispersant. The α-olefin-maleic anhydride copolymer represented by the structural formula (II), the styrene-(meth)acryl copolymer, the water-soluble polyurethane resin, and the water-soluble polyester resin are all solids at normal temperature, and are hardly soluble in cold water. These materials exhibit an effect as a dispersion stabilizer when they are made dissolved in an equal amount or more (preferably 1.0 to 1.5 times the acid value of the copolymer or resin) of an alkaline solution or alkaline aqueous solution to the acid value of the copolymer or resin mentioned.

Dissolving the polymer or resin in the alkaline solution or alkaline aqueous solution can be easily performed by heating and stirring. However, in the case where an olefin chain in the α-olefin-maleic anhydride copolymer is long, it is relatively difficult to dissolve the α-olefin-maleic anhydride copolymer in the alkaline solution or alkaline aqueous solution, and it is sometime the case that insoluble products remain. Having said that, the α-olefin-maleic anhydride copolymer dissolved in the alkaline solution or alkaline aqueous solution does not lose the effect as the dispersion stabilizer as long as these insoluble products are removed using an appropriate filter or the like.

Examples of the based used in the alkali solution or alkaline aqueous solution include: hydroxides of alkali metal such as sodium hydroxide, potassium hydroxide, and lithium hydroxide; basic materials such as ammonium, triethyl amine, and morpholine; and alcohol amines such as triethanol amine, diethanol amine, N-methyldiethanol amine, 2-amino-2-ethyl-1,3-propanediol, and choline.

The α-olefin-maleic anhydride copolymer represented by the structural formula (II) may be appropriately synthesized for use, or selected from commercial products. Examples of the commercial products thereof include T-YP112, T-YP115, T-YP114, and T-YP116 (all manufactured by SEIKO PMC CORPORATION).

The styrene-(meth)acryl copolymer may be appropriately synthesized for use, or selected from commercial products. Examples of the commercial products thereof include: JC-05 (manufactured by SEIKO PMC CORPORATION); and ARUFON UC-3900, ARUFON UC-3910, and ARUFON UC-3920 (all manufactured by TOAGOSEI CO., LTD.).

The water-soluble polyurethane resin may be appropriately synthesized for use, or selected from commercial products. Examples of the commercial products thereof include TAKELAC W-5025, TAKELAC W-6010, and TAKELAC W-5661 (manufactured by Mitsui Chemicals, Inc.).

The water-soluble polyester resin may be appropriately synthesized for use, or selected from commercial products. Examples of the commercial products thereof include: NICHIGO POLYESTER W-0030, NICHIGO POLYESTER W-0005S30WO, and NICHIGO POLYESTER WR-961 (manufactured by Nippon Synthetic Chemical Industry Co., Ltd.); and PESRESIN A-210, and PESRESIN A-520 (manufactured by TAKAMATSU OIL & FAT CO., LTD.).

An acid value of the polymeric dispersion stabilizer is preferably 40 mgKOH/g to 400 mgKOH/g, more preferably 60 mgKOH/g to 350 mgKOH/g. When the acid value thereof is less than 40 mgKOH/g, the solubility thereof to the alkaline solution may be poor. When the acid value thereof is more than 400 mgKOH/g, the viscosity of the pigment is high, which may degrade jetting ability, or which may degrade dispersion stability of the pigment dispersion itself.

The mass average molecular weight of the polymeric dispersion stabilizer is preferably 20,000 or smaller, more preferably 5,000 to 20,000. When the mass average molecular weight thereof is smaller than 5,000, the dispersion stability of the pigment dispersion may be low. When the mass average molecular weight thereof is larger than 20,000, the solubility of the alkaline solution may be poor, or the viscosity thereof may be high.

An amount of the polymeric dispersion stabilizer for use is preferably 1 part by mass to 100 parts by mass (solid content basis), more preferably 5 parts by mass to 50 parts by mass, relative to the 100 parts by mass of the pigment. When the amount thereof is less than 1 part by mass, an effect of stabilizing the dispersion may not be exhibited. When the amount thereof is more than 100 parts by mass, the viscosity of the resulting ink increases, which may deteriorate jetting ability of the ink from a nozzle, and therefore it is economically disadvantageous.

—Pigment Dispersant—

The colorant of the third embodiment preferably contains a pigment dispersant. The pigment dispersant is preferably an anionic surfactant or a nonionic surfactant having a HLB number of 10 to 20.

Examples of the anionic surfactant include polyoxyethylene alkyl ether acetic acid salts, alkyl benzene sulfonic acid salts (for example, of $NH_4$, Na, Ca or the like), alkyldiphenyl ether disulfonic acid salts (for example, of $NH_4$, Na, Ca or the like), dialkyl succinate sodium sulfonate (Na salt), a sodium naphthalene sulfonate-formalin condensate (Na salt), polyoxyethylene polycyclic phenyl ether sulfuric acid ester salt (for example, of $NH_4$, Na, or the like), lauric acid salts, polyoxyethylene alkyl ether sulfate salt, and oleic acid salts. Among them, sodium dioctylsulfosuccinate (Na salt), and polyoxyethylene styrene phenyl ether ammonium sulfonate ($NH_4$ salt) are particularly preferable.

Examples of the nonionic surfactant having the HLB number of 10 to 20 include polyoxyethylene alkyl ether, polyoxyalkylene alkyl ether, polyoxyethylene polycyclic phenyl ether, sorbitan fatty acid ester, polyoxyethylene sorbitan fatty acid ester, polyoxyethylene alkylphenyl ether, polyoxyethylene alkyl amine, polyoxyethylene alkyl amide, and acetylene glycol. Among them, polyoxyethylene lauryl ether, polyoxyethylene-β-naphthyl ether, polyoxyethylene sorbitan monooleate, and polyoxyethylene styrene phenyl ether are particularly preferable.

An amount of the dispersant is preferably 1 part by mass to 100 parts by mass, more preferably 10 parts by mass to 50 parts by mass relative to 100 parts by mass of the pigment. When the amount of the dispersant for use is small, the pigment cannot be sufficiently finely dispersed. When the amount thereof is excessively large, an excessive portion thereof that is not adsorbed on the pigment influences on the physical properties of the resulting ink, which may cause smearing of images, low water resistance, and low abrasion resistance.

The pigment dispersion is prepared by making the pigment dispersant dissolve in an aqueous medium, adding the pigment thereto to sufficiently wet the pigment, and then dispersing the mixture at high speed by means of a homogenizer, a disperser using balls (e.g. as a bead mill and a ball mill), a kneading disperser using shearing force (e.g. a roll mill), or an ultrasonic disperser. In many cases, coarse particles are contained in the dispersion after the kneading and dispersion step mentioned above, which causes clogging of inkjet nozzles or supplying channels. Therefore, it is necessary to remove particles having diameters of 1 µm or larger by means of a filter or a centrifuge.

The average particle diameter ($D_{50}$) of droplets of the pigment dispersion in the ink is preferably 150 nm or smaller, more preferably 100 nm or smaller. When the average particle diameter ($D_{50}$) thereof is larger than 150 nm, the jetting stability of the resulting ink significantly is lowered, which may cause clogging of nozzles or bend a track of the jetted ink. Moreover, when the average particle diameter ($D_{50}$) thereof is 100 nm or smaller, the jetting stability of the resulting ink improves, and moreover, saturation of images formed with the resulting ink improves.

An amount of the colorant for use in the inkjet ink is preferably 2% by mass to 15% by mass, more preferably 3% by mass to 12% by mass.

When the amount thereof is less than 2% by mass, coloring ability of the ink and image density are low. When the amount thereof is more than 15% by mass, a viscosity of the resulting ink may be high, and it is not preferable economically.

<Surfactant>

The surfactant is preferably selected from the ones that do not impair the dispersion stability depending on the combination with the colorant or wetting agent for use, have high surface tension, and high leveling ability, and the surfactant is preferably at least one selected from the group consisting of a silicone-based surfactant and a fluorine-based surfactant. Among them, the fluorine-based surfactant is particularly preferable.

In the fluorine-based surfactant, a number of carbon atoms substituted with a fluorine atom is preferably 2 to 16, more preferably 4 to 16. When the number of the carbon atoms is smaller than 2, the effect originated from fluorine may not be exhibited. When the number thereof is larger than 16, there are problems such as poor storage stability of the ink.

Examples of the fluorine-based surfactant include a perfluoroalkyl sulfonic acid compound, a perfluoroalkyl carboxylic acid compound, a perfluoroalkyl phosphoric acid ester compound, a perfluoroalkyl ethylene oxide adduct, and a polyoxyalkylene ether polymer compound having a perfluoroalkyl ether group at a side chain thereof. Among them, a polyoxyalkylene ether polymer compound having a perfluoroalkyl ether group at a side chain thereof is particularly preferable, as it has low foamability.

Examples of the perfluoroalkyl sulfonic acid compound include perfluoroalkyl sulfonic acid, and perfluoroalkyl sulfonic acid salt.

Examples of the perfluoroalkyl carboxylic acid compound include perfluoroalkyl carboxylic acid, and perfluoroalkyl carboxylic acid salt.

Examples of the perfluoroalkyl phosphoric acid ester compound include perfluoroalkyl phosphoric acid ester, and perfluoroalkyl phosphoric acid ester salt.

Examples of the polyoxyalkylene ether polymer compound having a perfluoroalkyl ether group at a side chain thereof include a polyoxyalkylene ether polymer having a perfluoroalkyl ether group at a side chain thereof, a sulfuric acid ester salt of polyoxyalkylene ether polymer having a perfluoroalkyl ether group at a side chain thereof, and a salt of a polyoxyalkylene ether polymer having a perfluoroalkyl ether group at a side chain thereof.

Examples of the counter ion of the salt in the fluorine-based surfactant mentioned above include Li, Na, K, $NH_4$, $NH_3CH_2CH_2OH$, $NH_2(CH_2CH_2OH)_2$, and $NH(CH_2CH_2OH)_3$.

The fluorine-based surfactant may be appropriately synthesized for use, or selected from commercial products.

Examples of the commercial products thereof include: SURFLONS-111, S-112, S-113, S-121, S-131, S-132, S-141, S-145 (all manufactured by AGC SEIMI CHEMICAL CO., LTD); FLOURAD FC-93, FC-95, FC-98, FC-129, FC-135, FC-170C, FC-430, FC-431 (all manufactured by Sumitomo 3M Limited); MEGAFACE F-470, F-1405, F-474 (all manufactured by DIC Corporation); ZONYL TBS, FSP, FSA, FSN-100, FSN, FSO-100, FSO, FS-300, UR (all manufactured by Du Pont Kabushiki Kaisha);FT-110, FT-250, FT-251, FT-400S, FT-150, FT-400SW (all manufactured by NEOS COMPANY LIMITED); and PolyFox PF-151N (manufactured by Omnova Solutions, Inc.). Among them, FS-300 of Du Pont Kabushiki Kaisha, FT-110, FT-250, FT-251, FT-400S, FT-150, and FT-400SW of NEOS COMPANY LIMITED, and PolyFox PF-151N of Omnova Solutions, Inc. are particularly preferable because use thereof helps to obtain excellent printing quality, especially saturation, and significantly improves level dying to paper.

As specific examples of the fluorine-based surfactant, those represented by the following structural formulae are preferable.
(1) Anionic Fluorine-Based Surfactant

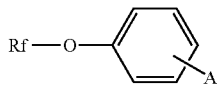

In the structural formula above, Rf represents a mixture of fluorine-containing hydrophobic groups represented by the following structural formulae; A is $-SO_3X$, $-COOX$, or $-PO_3X$, where X represents a counter ion, specifically, a hydrogen atom, Li, Na, K, $NH_4$, $NH_3CH_2CH_2OH$, $NH_2(CH_2CH_2OH)_2$, or $NH(CH_2CH_2OH)_3$.

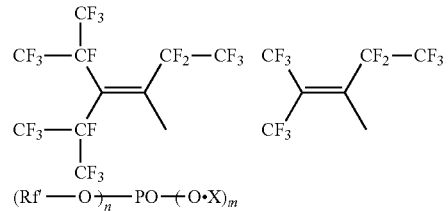

In the formula above, Rf' denotes a fluorine-containing group represented by the following structural formula, X denotes the same as explained earlier, n denotes an integer of 1 or 2, and m denotes 2-n.

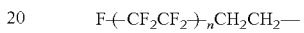

In the formula above, n denotes an integer of 3 to 10.

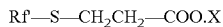

In the formula above, Rf' and X denote the same as explained earlier.

In the formula above, Rf' and X denote the same as explained earlier.

(2) Nonionic Fluorine-Based Surfactant

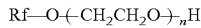

In the formula above, Rf denotes the same as explained earlier, and n is an integer of 5 to 20.

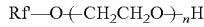

In the formula above, Rf' denotes the same as explained earlier and n is an integer of 1 to 40.

(3) Amphoteric Fluorine-Based Surfactant

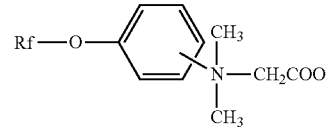

In the formula above, Rf denotes the same as explained earlier.

(4) Oligomer Fluorine-Based Surfactant

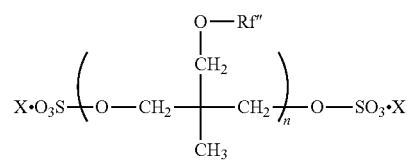

In the formula above, Rf'' denotes a fluorine-containing group represented by the following formula, n in an integer of 0 to 10, and X denotes the same as explained earlier.

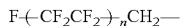

In the formula above, n in an integer of 1 to 4.

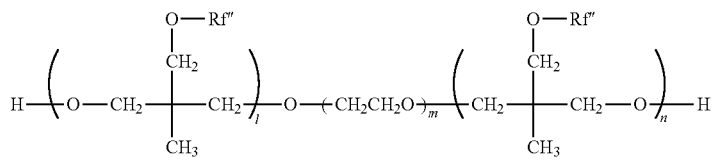

In the formula above, Rf" denotes the same as explained earlier, l is an integer of 0 to 10, m is an integer of 0 to 10, and n is an integer of 0 to 10.

The silicone-based surfactant is appropriately selected depending on the intended purpose without any restriction, but it is preferably selected from those are not decomposed at high pH. Examples of the silicone-based surfactant include side chain-modified polydimethylsiloxane, both terminals-modified polydimethylsiloxane, one terminal-modified polydimethylsiloxane, and side chain and both terminals-modified polydimethylsiloxane. The silicone-based surfactant having a polyoxyethylene group, and a polyoxyethylene polyoxypropylene group is particularly preferable because it has excellent properties as an aqueous surfactant.

Such the surfactant for use may be appropriately synthesized or selected from commercial products.

The commercial products of the silicone-based surfactant can be readily available from BYK Japan K.K., Shin-Etsu Chemical Co., Ltd., Dow Corning Toray Co., Ltd., and the like.

The polyether-modified silicone-based surfactant is appropriately selected depending on the intended purpose without any restriction, and examples thereof include a compound represented by the following structural formula, in which the polyalkylene oxide structure is introduced to a side chain from Si of dimethyl polysiloxane.

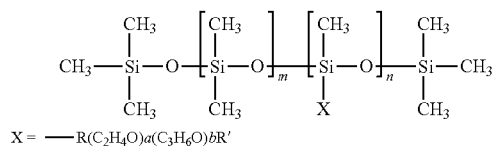

X = ——R(C₂H₄O)a(C₃H₆O)bR'

In the structural formula above, m, n, a, and b each independently represent an integer; and R and R' are each independently represent an alkyl group or an alkylene group.

The polyether-modified silicone compound may be available as a commercial product, and examples thereof include KF-618, KF-642, and KF-643 (all manufactured by Shin-Etsu Chemical Co., Ltd.).

Examples of the anionic surfactant include an acetic acid salt of polyoxyethylene alkylether, dodecylbenzene sulfonic acid salt, succinic ester sulfonic acid salt, lauryl acid salt, and a salt of polyoxyethylene alkyl ether sulfate.

Examples of the nonionic surfactant include polyoxyethylene alkyl ether, polyoxypropylene polyoxyethylene alkyl ether, polyoxyethylene alkyl ester, polyoxyethylene sorbitan fatty acid ester, polyoxyethylene alkylphenyl ether, polyoxyethylene alkyl amine, and polyoxyethylenealkylamide.

An amount of the surfactant in the inkjet ink is preferably 0.01% by mass to 3.0% by mass, more preferably 0.5% by mass to 2% by mass.

When the amount thereof is less than 0.01% by mass, the surfactant may not sufficiently exhibit its effect. When the amount thereof is more than 3.0% by mass, the resulting ink has excessively high penetration ability to recording media, which may cause low image density or strike through.

<Penetrating Agent>

The penetrating agent preferably contains a C8-C11 polyol compound or a C8-C11 glycol ether compound.

The penetrating agent is different from the wetting agent, but it does not mean that the penetrating agent does not have wettability at all. However, the wettability of the penetrating agent is relatively lower than that of the wetting agent, and therefore it can be said that the penetrating agent has non-wettability. In the present specification, "non-wettability" has the following meaning.

The penetration agent is preferably selected from those having a solubility of 0.2% by mass to 5.0% by mass to water of 25° C.

Among them, 2-ethyl-1,3-hexanediol [solubility: 4.2% (25° C.)], and 2,2,4-trimethyl-1,3-pentanediol [solubility: 2.0% (25° C.)] are particularly preferable.

As other polyol compounds, there is an aliphatic diol, and examples of the aliphatic diol include 2-ethyl-2-methyl-1,3-propanediol, 3,3-dimethyl-1,2-butanediol, 2,2-diethyl-1,3-propanediol, 2-methyl-2-propyl-1,3-propane diol, 2,4-dimethyl-2,4-pentanediol, 2,5-dimethyl-2,5-hexanediol, and 5-hexene-1,2-diol.

Other penetrating agents that can be used in combination with those mentioned above are suitably selected depending on the intended purpose without any restriction, provided that they can dissolve in the ink and adjust an ink to have desirable properties, and examples thereof include; alkyl or allyl ethers of polyhydric alcohols, such as diethylene glycol monophenyl ether, ethylene glycol monophenyl ether, ethylene glycol monoallyl ether, diethylene glycol monophenyl ether, diethylene glycol monobutylether, propylene glycolmonobutylether, and tetraethylene glycol chlorophenyl etherl; and lower alcohols such as ethanol.

An amount of the penetrating agent for use in the inkjet ink is preferably 0.1% by mass to 4.0% by mass. When the amount thereof is less than 0.1% by mass, a resulting ink may not have fast drying properties, leading to formation of burred images. When the amount thereof is more than 4.0% by mass, the dispersion stability of the colorant is impaired, which may easily cause nozzle clogging, or the resulting ink may extremely high penetrating ability to recording media more than necessary, which may cause low image density or strike through.

<Water-Dispersible Resin>

The water-dispersible resin is excellent in a film forming ability (image forming ability), has high water repellency, high water resistance and high weather resistance, and is effective for recording high water resistant images at high image density (high coloring ability).

Examples of the water-dispersible resin include condensate-based synthesized resins, addition-based synthesized resin, and natural polymer compounds.

Examples of the condensation-based synthetic resin include polyester resins, polyurethane resins, polyepoxy resins, polyamide resins, polyether resins, poly(meth)acrylic resins, acryl-silicone resins, and fluororesins.

Examples of the addition-based synthetic resin include polyolefin resins, polystyrene resins, polyvinyl alcohol resins, polyvinyl ester resins, polyacrylic acid resins, and unsaturated carboxylic acid resins.

Examples of the aforementioned natural polymer compound include cellulose, rosin, and natural rubber.

Among them, polyurethane resin particles, acryl-silicone resin particles, and fluororesin particles are particularly preferable.

Moreover, two or more resins may be used in combination as the water-dispersible resin without any problem.

As the fluororesin, fluororesin particles having fluoroolefin unit are preferable. Among them, fluorine-containing vinyl ether resin particles consisting of a fluoroolefin unit and a vinyl ether unit are particularly preferable.

The fluoroolefin unit is suitably selected depending on the intended purpose without any restriction. Examples thereof include —$CF_2CF_2$—, —$CF_2CF(CF_3)$—, and —$CF_2CFCl$—.

The vinyl ether unit is suitably selected depending on the intended purpose without any restriction. Examples thereof include the compounds represented by the following structural formulae.

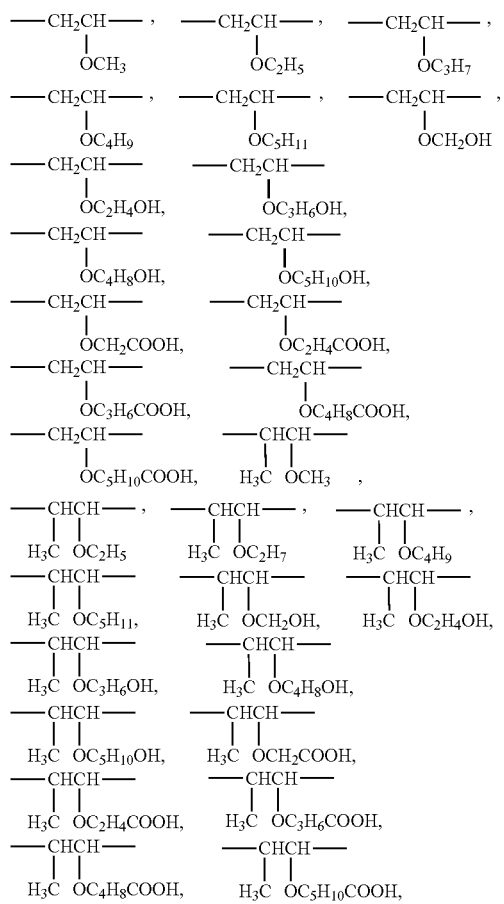

The fluorine-containing vinyl ether resin particles consisting of the fluoroolefin unit and the vinyl ether unit are preferably particles of an alternating copolymer in which the fluoroolefin unit and the vinyl ether unit are alternately copolymerized. Such fluororesin particles may be selected from those appropriately synthesized, or commercial products for use.

Examples of the commercial products thereof include: FLUONATE FEM-500, FEM-600, DIC GUARD F-52S, F-90, F-90M, F-90N, AQUAFURFURAN TE-5A, manufactured by DIC Corporation; LUMIFLON FE4300, FE4500, FE4400, AsahiGuard AG-7105, AG-950, AG-7600, AG-7000, AG-1100, manufactured by ASAHI GLASS CO., LTD.

The water-dispersible resin may be used in the form of a homopolymer, or a composite resin using a copolymer, and it may have any structure of a single-phase structure, a core-shell structure, or power-feed emulsion.

As the water-dispersible resin, a resin having a hydrophilic group and having self-dispersibility, and a resin that does not have dispersibility and to which dispersibility has been given by a surfactant or a resin having a hydrophilic group can be used. Among them, resin particle emulsion obtained by emulsifying or suspension-polymerizing iomers of a polyester resin or polyurethane resin, or unsaturated monomers is particularly suitable. In the case where the resin particle emulsion is prepared by emulsion-polymerization of the unsaturated monomers, the resin emulsion is obtained by performing a reaction in water to which the unsaturated monomers, a polymerization initiator, a surfactant, a chain transfer agent, a chelating agent, a pH regulator, and the like are added. Therefore, the water-dispersible resin can be easily obtained, and with this method, the resin of desirable properties can be easily prepared as the resin structure can be easily altered.

Examples of the unsaturated monomer include one or any arbitral combination selected from: unsaturated carboxylic acid monomers, monofunctional or polyfunctional (meth) acrylate monomers, (meth)acrylic acid amide monomers, aromatic vinyl monomers, vinylcyano compound monomers, vinyl monomers, allyl compound monomers, olefin monomers, diene monomers, and oligomers having carbon-carbon unsaturated bonds.

By combining these monomers, characteristics of the water-dispersible resin to be produced are easily changed. Moreover, the properties of the resin can also be changed by performing polymerization reaction or graft reaction using an oligomer polymerization initiator as the aforementioned polymerization initiator.

Examples of the unsaturated carboxylic acid monomer as the unsaturated monomer include acrylic acid, methacrylic acid, itaconic acid, fumaric acid, and maleic acid.

Examples of the monofunctional (meth)acrylate monomer as the unsaturated monomer include methylmethacrylate, ethylmethacrylate, isopropylmethacrylate, n-butylmethacrylate, isobutylmethacrylate, n-amylmethacrylate, isoamylmethacrylate, n-hexylmethacrylate, 2-ethylhexylmethacrylate, octylmethacrylate, decylmethacrylate, dodecylmethacrylate, octadecylmethacrylate, cyclohexylmethacrylate, phenylmethacrylate, benzylmethacrylate, glycidylmethacrylate, 2-hydroxyethylmethacrylate, 2-hydroxypropylmethacrylate, dimethylaminoethylmethacrylate, methacryloxyethyltrimethyl ammonium salt, 3-methacryloxypropyltrimethoxysilane, methylacrylate, ethylacrylate, isopropylacrylate, n-butylacrylate, isobutylacrylate, n-amylacrylate, isoamylacrylate, n-hexylacrylate, 2-ethylhexylacrylate, octylacrylate, decylacrylate, dodecylacrylate, octadecylacrylate, cyclohexylacrylate, phenylacrylate, benzylacrylate, glycidylacrylate, 2-hydroxyethylacrylate, 2-hydroxypropylacrylate, dimethylaminoethylacrylate, and acryloxyethyltrimethyl ammonium salt.

Examples of the he polyfunctional (meth)acrylate monomers include ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, polypropylene glycol dimethacrylate, polybutylene glycol dimethacrylate, 2,2'-bis(4-methacryloxydiethoxyphenyl)propane, trimethylol propane trimethacrylate, trimethylol ethane trimethacrylate, polyethylene glycol diacrylate, triethylene glycol diacrylate, 1,3-butylene glycol diacrylate, 1,4-butylene glycol diacrylate, 1,6-hexanediol diacrylate, neopentyl glycol diacrylate, 1,9-nonanediol diacrylate, polypropylene glycol diacrylate, 2,2'-bis(4-acryloxypropyloxyphenyl)propane, 2,2'-bis(4-acryloxydiethoxyphenyl)propane trimethylolpropane triacrylate, trimethylol ethane triacrylate, tetramethylol methane triacrylate, ditrimethylol tetraacrylate, tetramethylol methane tetraacrylate, pentaerythritol tetraacrylate, and dipentaerythritol hexaacrylate. Examples of the (meth)acrylic acid amide monomers include acryl amide, methacryl amide, N,N-dimethylacryl amide, methylene bisacryl amide, and 2-acrylamide-2-methylpropane sulfonic acid.

Examples of the aromatic vinyl monomers include styrene, α-methylstyrene, vinyltoluene, 4-t-butylstyrene, chlorostyrene, vinyl anisole, vinyl naphthalene, and divinyl benzene.

Examples of the vinyl cyano compound monomers include acrylonitrile, and methacrylonitrile.

Examples of the vinyl monomers include vinyl acetate, vinylidene chloride, vinyl chloride, vinyl ether, vinyl ketone, vinyl pyrrolidone, vinyl sulfonic acid or salts thereof, vinyl trimethoxy silane, and vinyl triethoxy silane.

Examples of the allyl compound monomers include allyl sulfonic acid and salts thereof, allyl amine, allyl chloride, diallyl amine, and diallyldimethyl ammonium salts.

Examples of the olefin monomers include ethylene and propylene.

Examples of the diene monomers include butadiene, and chloroprene.

Examples of the oligomer having an unsaturated bond of a carbon atom include: a styrene oligomer having a methacryloyl group, a styrene-acrylonitrile oligomer having a methacryloyl group, a methylmethacrylate oligomer having a methacryloyl group, a dimethylsiloxane oligomer having a methacryloyl group, and a polyester oligomer having an acryloyl group.

The water dispersible resin causes scission of the molecular chain due to dispersion breakage or hydrolysis under the strong alkaline or acidic condition. Therefore, the pH value of the water-dispersible resin before formulated into the ink is preferably 4 to 12, more preferably 6 to 11 in view of the compatibility to the water-dispersible pigment, and even more preferably 7 to 9.

The average particle diameter ($D_{50}$) of the water-dispersible resin relates to viscosity of the dispersion liquid thereof, and the viscosity thereof increases as the particle diameter reduces, provided that the formulation and solid content of the dispersion liquid are the same.

Accordingly, for preventing the viscosity of the resulting ink from becoming too high, the average particle diameter ($D_{50}$) of the water-dispersible resin is preferably 50 nm or larger.

When the particle diameter thereof is approximately a several ten micrometers, the particles of the water-dispersible resin are bigger than an opening diameter of a nozzle of a head of a recording device, and therefore such the water-dispersible resin cannot be used.

When the large particles of the water-dispersible resin are present in the ink, the ink has poor jetting ability even through the particle diameter thereof is smaller than the opening of the nozzle.

The average particle diameter ($D_{50}$) of the water-dispersible resin is preferably 200 nm or smaller, more preferably 150 nm or smaller for ensuring jetting stability of the resulting ink.

Moreover, since the water-dispersible resin has a function of helping the water-dispersible coloring agent to fix on a recording medium, the water-dispersible resin is preferably capable of form a film at normal temperature.

For this reason, a minimum film forming temperature (MFT) of the water-dispersible resin is preferably 30° C. or lower.

When a glass transition temperature of the water-dispersible resin is −40° C. or lower, viscosity of a resin film increases, which may give tackiness (i.e. tackiness of the dried ink) to the recorded matter. Therefore, the glass transition temperature of the water-dispersible resin is preferably −30° C. or higher.

An amount of the water-dispersible resin contained in the ink is preferably 1% by mass to 15% by mass, more preferably 2% by mass to 7% by mass based on the solid content thereof.

The solid contents of the colorant, the pigment in the colorant, and the water-dispersible resin can be measured, for example, by separating the portion of the colorant, and the portion of the water-dispersible resin from the ink.

In the case where a pigment is used as the colorant, a ratio of the colorant and the water-dispersible resin can be measured by evaluating a mass reduction rate by thermal mass spectrometry.

In the case where a molecular structure of the colorant is known, it is possible to determine a solid content of the colorant by NMR for the pigment or dye. In the case where the colorant is an inorganic pigment, metal-containing organic pigment, or metal containing dye, which contains a heavy metal atom in the molecular structure thereof, the solid content of the colorant can be determined by X-ray fluorescence spectrometry.

Moreover, the inkjet ink of the present invention has a moisture content of, generally, more than 50% by mass, and the total amount of the resin and the pigment in the ink is generally more than 3% by mass. Therefore, the solvent evaporation rate of the ink is generally 50% by mass to 97% by mass.

—Other Components—

Other components are suitably selected depending on the intended purpose without any restriction, and examples thereof include a pH regulator, a preservative and fungicide, a chelating reagent, an anti-rust agent, an antioxidant, an ultraviolet absorber, an oxygen absorbent, and a photostabilizer.

The pH regulator is suitably selected depending on the intended purpose without any restriction, provided that it does not adversely affect the resulting ink and it can adjust a pH value of the resulting ink to the range of 7 to 11. Examples thereof include alcohol amines, alkali metal hydroxides, ammonium hydroxides, phosphonium hydroxides, and alkali metal carbonates. When the pH value of the ink is lower than 7, or higher than 11, the ink may dissolve a head or ink-supplying unit of a recording device to thereby change the properties of the ink or to cause leakages of the ink, which may cause problems such as jetting failures.

Examples of alcohol amines include diethanol amine, triethanol amine, 2-amino-2-ethyl-1,3-propanediol.

Examples of alkali metal hydroxides include lithium hydroxide, sodium hydroxide, and potassium hydroxide.

Examples of ammonium hydroxides include ammonium hydroxide, and quaternary ammonium hydroxide. Examples of phosphonium hydroxide include quaternary phosphonium hydroxide.

Examples of alkali metal carbonates include lithium carbonate, sodium carbonate, and potassium carbonate.

As the preservative and fungicide, for example, sodium dehydroacetate, sodium sorbate, sodium-2-pyridinethiol-1-oxide, sodium benzoate, sodium pentachlorophenol, and the like are suitably used.

As the chelating reagent, for example, sodium ethylenediaminetetraacetate, sodium nitrilotriacetate, sodium hydroxyethylethylenediaminetriacetate, sodium diethylenetriaminepentaacetate, sodium uramildiacetate, and the like are suitably used.

As the anti-rust agent, for example, acidic sulfite salt, sodium thiosulfate, ammonium thiodiglycolate, diisopropyl ammonium nitrite, pentaerythritol tetranitrate, dicyclohexyl ammonium nitrite, and the like are suitably used.

As the antioxidant, for example, a phenol-based antioxidant (including a hindered phenol-based antioxidant), an amine-based antioxidant, a sulfur-based antioxidant, a phosphorous-based antioxidant, and the like are suitably used.

Examples of the phenol-based antioxidant (including a hindered phenol-based antioxidant) include butylated hydroxyanisole, 2,6-di-tert-butyl-4-ethyl phenol, stearyl-β-(3,5-di-tert-butyl-4-hydroxyphenyl)propionate, 2,2'-methylenebis(4-methyl-6-tert-butylphenol), 2,2'-methylenebis(4-ethyl-6-tert-butylphenol), 4,4'-butylidenebis (3-methyl-6-tert-butylphenol), 3,9-bis[1,1-dimethyl-2-[6-(3-tert-butyl-4-hydroxy-5-methylphenyl)propionyloxy]ethyl]-2,4,8,10-tetraoxaspiro[5,5]undecane, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, and tetrakis[methylene-3-(3',5'-di-tert-butyl-4'-hydroxyphenyl)propionate]methane.

Examples of the amine-based antioxidant include phenyl-β-naphthyl amine, α-naphthyl amine, N,N'-di-sec-butyl-p-phenylene diamine, phenothiazine, N,N'-diphenyl-p-phenylene diamine, 2,6-di-tert-butyl-p-cresol, 2,6-di-tert-butylphenol, 2,4-dimethyl-6-tert-butyl-phenol, butylhydroxyanisole, 2,2'-methylenebis(4-methyl-6-tert-butylphenol), 4,4'-butylidenebis(3-methyl-6-tert-butylphenol), 4,4'-thiobis (3-methyl-6-tert-butylphenol), tetrakis[methylene-3(3,5-di-tert-butyl-4-dihydroxyphenyl)propionate]methane, and 1,1,3-tris(2-methyl-4-hydroxy-5-tert-butylphenyl)butane.

Examples of the sulfur-based antioxidant include dilauryl-3,3'-thiodipropionate, distearylthiodipropionate, laurylstearylthiodipropionate, dimyristyl-3,3'-thiodipropionate, distearyl-β,β'-thiodipropionate, 2-mercaptobenzoimmidazole, and dilauryl sulfide.

Examples of the phosphorous-based antioxidant include triphenyl phosphate, octadecyl phosphate, triisodecyl phosphate, trilauryltrithio phosphate, and trinonylphenyl phosphate.

Examples of the ultraviolet absorber include a benzophenone-based ultraviolet absorber, a benzotriazol-based ultraviolet absorber, a salicylate-based ultraviolet absorber, a cyanoacrylate-based ultraviolet absorber, and a nickel complex salt-based ultraviolet absorber.

Examples of the benzophenone-based ultraviolet absorber include 2-hydroxy-4-n-octoxybenzophenone, 2-hydroxy-4-n-dodecyloxybenzophenone, 2,4-dihydroxybenzophenone, 2-hydroxy-4-methoxybenzophenone, and 2,2',4,4'-tetrahydroxybenzophenone.

Examples of the benzotriazol-based ultraviolet absorber include 2-(2'-hydroxy-5'-tert-octylphenyl)benzotriazol, 2-(2'-hydroxy-5'-methylphenyl)benzotriazol, 2-(2'-hydroxy-4'-octoxyphenyl)benzotriazol, and 2-(2'-hydroxy-3'-tert-butyl-5'-methylphenyl)-5-chlorobenzotriazol Examples of the salicylate-based ultraviolet absorber include phenyl salicylate, p-tert-butylphenyl salicylate, and p-octylphenyl salicylate.

Examples of the cyanoacrylate-based ultraviolet absorber include ethyl-2-cyano-3,3'-diphenyl acrylate, methyl-2-cyano-3-methyl-3-(p-methoxyphenyl)acrylate, and butyl-2-cyano-3-methyl-3-(p-methoxyphenyl)acrylate.

Examples of the nickel complex salt-based ultraviolet absorber include nickelbis(octylphenyl)sulfide, nickel(II) 2,2'-thiobis(4-tert-octylferrate)-n-butyl amine, nickel(II) 2,2'-thiobis(4-tert-octylferrate)-2-ethylhexyl amine, and nickel(II) 2,2'-thiobis(4-tert-octylferrate)triethanol amine.

The inkjet ink of the present invention can be prepared by dispersing or dissolving water, the colorant, and the surfactant, preferably penetrating agent, and the water-dispersible resin, and optionally other substances, and stirring and mixing the mixture.

The dispersing can be performed, for example, by a sand mill, a homogenizer, a ball mill, a paint shaker, an ultrasonic disperser, or the like, and it is also carried out by an agitator using an agitating blade, a magnetic stirrer, a high-speed disperser, or the like.

The physical properties of the inkjet ink of the present invention are suitably adjusted depending on the intended purpose without any restriction. For example, the viscosity, surface tension, and pH of the ink are preferably within the following ranges.

The viscosity of the inkjet ink is preferably 3 mPa·s to 20 mPa·s at 25° C.

When the viscosity at 25° C. is 3 mPa·sec or less, image density of prints or image quality of characters to be recorded can be improved. When the viscosity thereof is 20 mPa·s or less, desirably jetting properties can be secured.

The viscosity can be measured, for example, by means of a viscometer (RL-550, manufactured by Toki Sangyo Co., Ltd.) at 25° C.

The surface tension of the inkjet ink is preferably 35 mN/m or less, more preferably 32 mN/m or less, at 25° C.

When the surface tension thereof is more than 35 mN/m, the resulting ink is not easily leveled on recording media, which may prolong the time required for drying.

The pH of the inkjet ink is preferably 8.5 or higher, more preferable 9.0 to 10.0.

When the pH thereof is lower than 8.5, the pH of the ink reduces during the storage over time, and aggregations may occur in the ink as well as increasing the viscosity of the ink.

The pH of the ink can be measured, for example, by means of a pH meter HM-30R (manufactured by TOA-DKK CORPORATION).

The color of the inkjet ink of the present invention is appropriately selected depending on the intended purpose without any restriction, and examples thereof include yellow, magenta, cyan, and black.

Recording using an ink set containing two or more of these colors of inks in combination enables to form multi-color images, and recording using an ink set containing all of these colors of inks enables to form full-color images.

The inkjet ink of the present invention can be suitably used with a printer equipped with any of a piezo inkjet head, a thermal inkjet head, an electrostatic inkjet head, where the piezo inkjet head is configured to eject ink droplets by deforming a vibration plate constituting of a wall surface of an ink flow channel to change the volume inside the ink flow channel using a piezoelectric element as a pressure generating unit for compressing the ink within the ink (see JP-A No. 02-51734), the thermal inkjet head is configured to generate air bubbles by heating an ink within an ink flow channel using a heat element (see JP-A No. 61-59911), and the electrostatic inkjet heat is configured to eject ink droplets by deforming a vibration plate with electrostatic force generated between the vibration plate and an electrode provided on a wall surface of an ink flow channel to face the vibration plate, to thereby change the volume inside the ink flow channel (see JP-A No. 06-71882).

The inkjet ink of the present invention is suitably used in various fields such as inkjet inks, inks for fountain pens, inks for ball-point pens, inks for marker pens, and inks for felt-tip pens, and it is particularly preferably used with an image forming device (e.g. a printer) of an inkjet recording system. For example, the inkjet ink can be used with a printer having a function of accelerating pint fixation by heating a recording paper and the inkjet ink at 50° C. to 200° C. during, or before and after printing, and the inkjet ink is particularly suitably used in the ink cartridge, ink recording method, ink recording device, and inkjet recorded matter of the present invention.

(Ink Cartridge)

The ink cartridge of the present invention contains a container, and the inkjet ink of the invention housed in the container, and may further contain other members, if necessary.

The container is not particularly restricted, and a shape, structure, size, and material thereof are appropriately selected depending on the intended purpose. For example, the container is preferably selected from those having at least an ink bag formed of an aluminum laminate film, a resin film, or the like.

Figure 2:
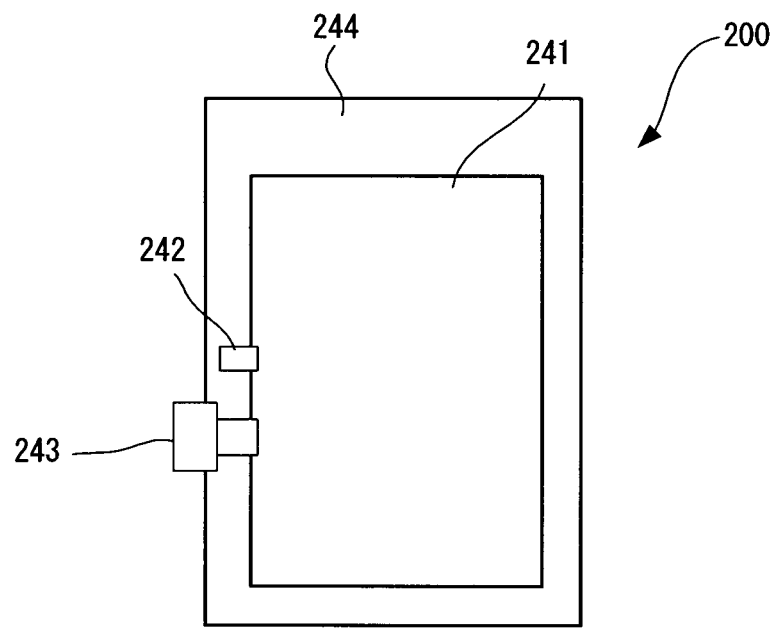
FIG. 2 is a schematic diagram illustrating a modified example of the ink cartridge of FIG. 1.

The ink cartridge will be explained with reference to FIGS. 1 and 2, hereinafter. FIG. 1 is a diagram showing one example of the ink cartridge of the present invention, and FIG. 2 is a diagram illustrating the ink cartridge 200 of FIG. 1 to which a casing (outer packaging) is included.

As shown in FIG. 1, the ink cartridge 200 contains an ink bag 241 to which the ink is supplied from an ink inlet 242, and the ink inlet 242 is sealed by fusing after releasing the air in the ink bag 241. At the time of use, the ink is supplied to a device by inserting a needle provided in the device into an ink outlet 243 formed of a rubber material.

The ink bag 241 is formed of an air-nonpermeable packaging material, such as an aluminum laminate film. As illustrated in FIG. 2, the ink bag 241 is generally housed in a cartridge case 244 formed of a plastic and used by detachably mounting it in various inkjet recording devices.

The ink cartridge of the present invention houses the inkjet ink of the present invention therein, and is used by detachably mounting the ink cartridge in various inkjet recording devices. Moreover, the ink cartridge of the present invention is particularly preferably used in the inkjet recording device of the present invention, which will be described later, by detachably mounting therein.

(Inkjet Recording Device and Inkjet Recording Method)

The inkjet recording device of the present invention contains at least an ink ejecting unit, and may further contain appropriately selected other members, such as a stimuli generating unit, and a controlling unit, if necessary.

The inkjet recording method of the present invention contains at least an ink ejecting step, and may further contain appropriately selected other steps, such as a stimuli generating step, and a controlling step, if necessary.

The inkjet recording method of the present invention can be suitably performed by means of the inkjet recording device of the present invention, and the ink ejecting step can be suitably performed by the ink ejecting unit. Moreover, other steps mentioned above can be suitably performed by other steps mentioned above.

—Ink Ejecting Step and Ink Ejecting Unit—

The ink ejecting step is applying stimuli to the inkjet ink of the present invention to make the inkjet ink jet to form an image.

The ink ejecting unit is a unit configured to apply stimuli to the inkjet ink of the present invention to make the inkjet ink jet to form an image. The ink ejecting unit is not particularly restricted, and examples thereof include various nozzles for ejecting inks.

The stimuli can be generated, for example, by the stimuli generating unit, and the stimuli is appropriately selected depending on the intended purpose without any restriction. Examples of the stimuli include heat (temperature), pressure, vibration, and light. These may be used independently, or in combination. Among them, heat and pressure are preferable.

Examples of the stimuli generating unit include a heater, a pressure device, a piezoelectric element, a vibration generator, an ultrasonic wave oscillator, and a light. Specific examples thereof include: piezoelectric actuators such as piezoelectric elements; thermal actuators utilizing phase changes attributable to film boiling of the liquid by using an electric heat exchanger element such as exothermic resistor; shape-memorizing alloy actuators using metal phase changes attributable to temperature change; and an electrostatic actuator using electrostatic force.

The embodiment of the jet of the inkjet ink is not particularly restricted, and varies depending on the stimuli applied. For example, in the case where the stimuli is heat, there is a method in which the heat energy corresponding to recording signals is applied to the inkjet ink located in the recording head by means of a thermal head to form the inkjet ink into air bubbles by the thermal energy, and using the pressure of the air bubbles, the inkjet ink is ejected from a nozzle opening of the recording head as droplets. Moreover, in the case where the stimuli is pressure, there is a method in which the pressure is applied to a piezoelectric element which is bonded to the position called as a piezoelectric chamber residing in the ink flow channel within the recording head to make the piezoelectric element bend to shrink the inner volume of the piezoelectric chamber and to thereby eject and spray the inkjet recording ink from the nozzle opening of the recording head as droplets.

A size of droplets of the inkjet ink to be jetted is, for example, preferably 3 pL to 40 pL, the speed for ejecting is preferably 5 m/s to 20 m/s, the driving frequency is preferably 1 kHz or higher, and the resolution is preferably 300 dpi or more.

The controlling unit is appropriately selected depending on the intended purpose without any restriction, provided that it can control movements of each unit, and examples thereof include devices such as sequencers, and computers.

Figure 3:
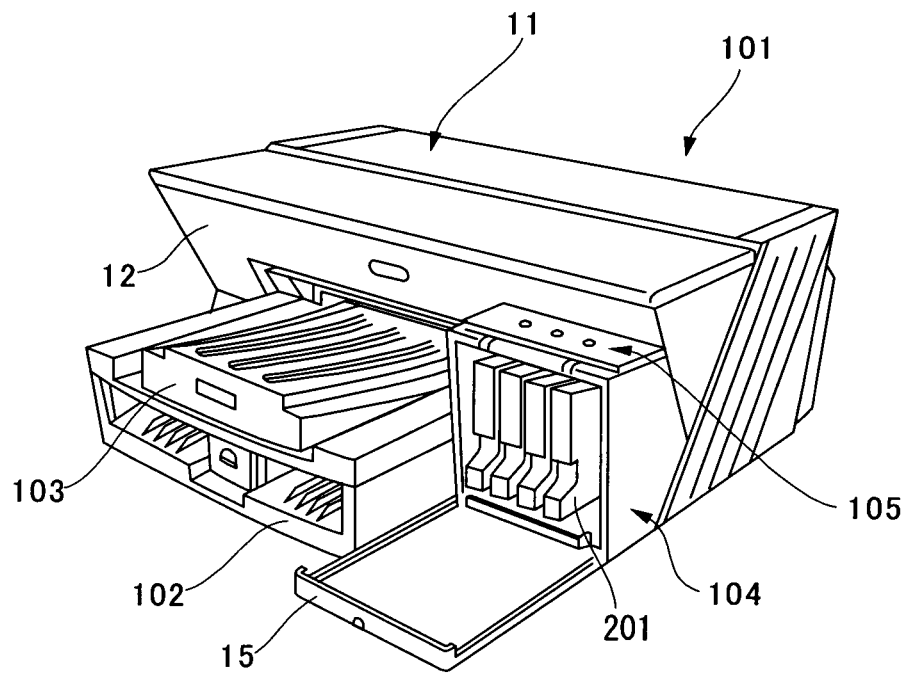
FIG. 3 is a perspective diagram illustrating one example of an inkjet recording device in which a cover for an ink cartridge loading section is open.

One embodiment for carrying out the inkjet recording method of the present invention by means of the inkjet recording device of the present invention will be explained with reference to drawings. The inkjet recording device illustrated in FIG. 3 contains a device body 101, a paper feeding tray 102 for feeding paper loaded in the device body, a paper discharging tray 103 for stacking the paper loaded in the device body and recorded (formed) with an image, and an ink cartridge loading section 104. In FIG. 3, 11 is a top cover, and 12 is a front face.

On the top face of the ink cartridge loading section 104, a control section 105, such as operation keys and an indicator, is arranged. The ink cartridge loading section 104 is provided with a front cover 15, which can be open and closed, to remove and load an ink cartridge 201.

Figure 4:
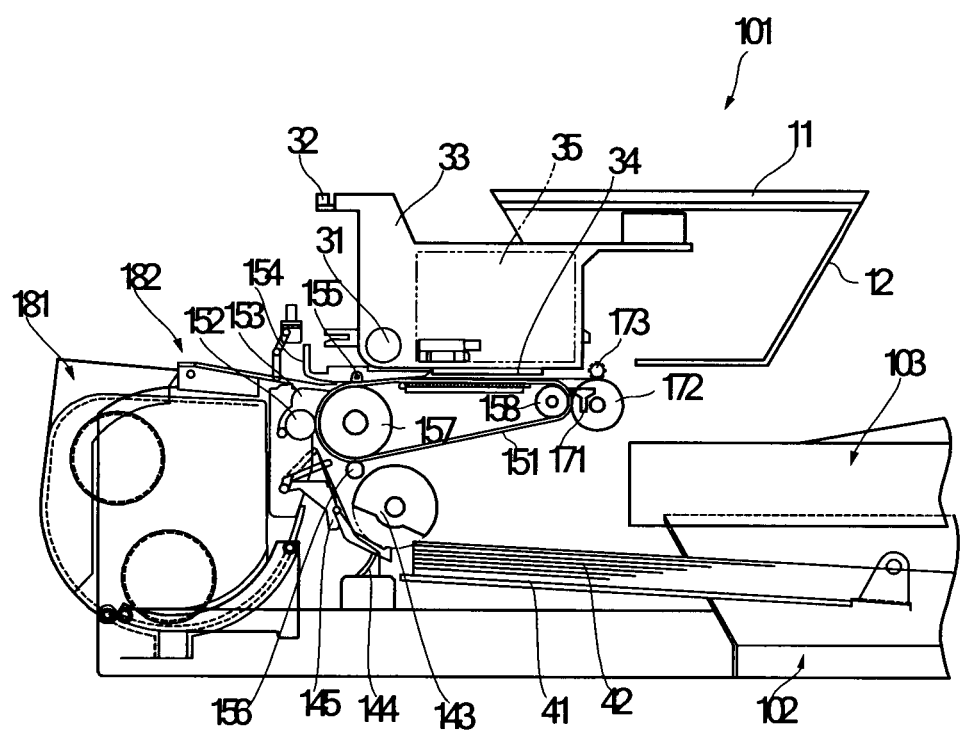
FIG. 4 is a cross-section diagram for explaining the entire structure of the inkjet recording device of FIG. 3.
Figure 5:
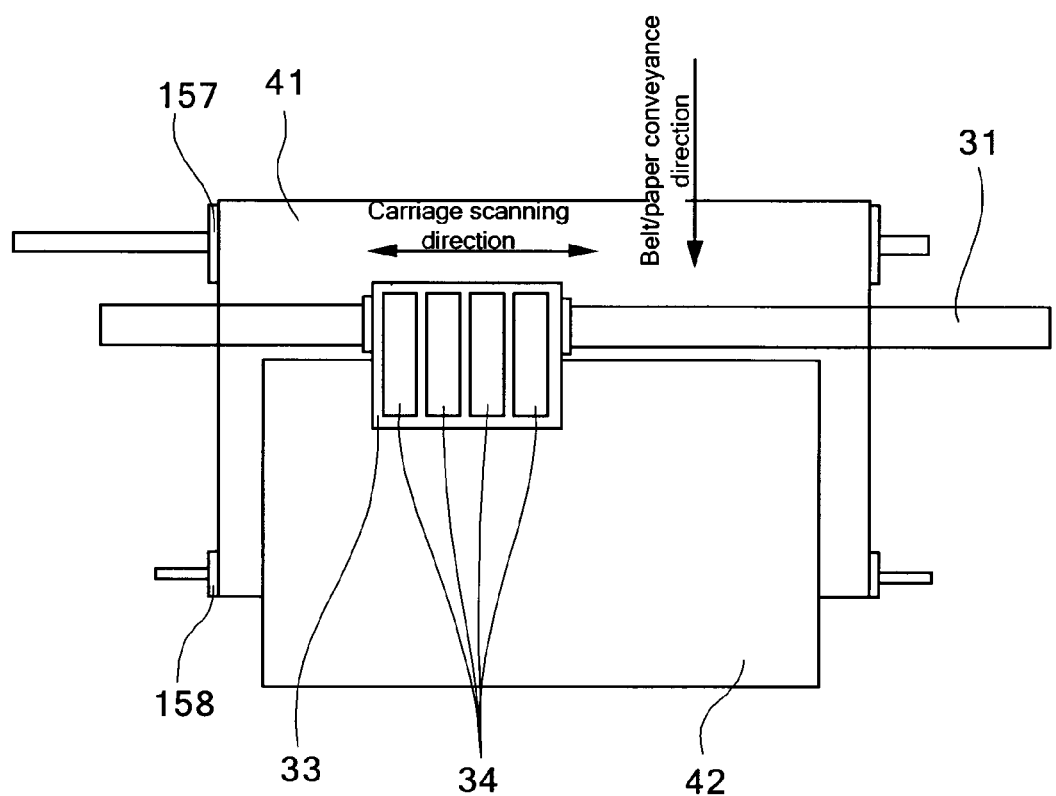
FIG. 5 is a schematic enlarged diagram illustrating one example of an inkjet head in an inkjet recording device.

In the device body 101, as illustrated in FIGS. 4 and 5, a carriage 33 is held free of sliding in the main scanning direction by a guide rod 31 and a stay 32, which are guide members laid across on lateral plates (not illustrated). Scanning is performed by a main scanning motor (not illustrated) in the direction indicated by the arrow in FIG. 5.

In the carriage 33, a recording head 34 including four inkjet recording heads which discharge recording ink drops for respective colors, yellow (Y), cyan (C), magenta (M), and black (Bk) is loaded, so that a plurality of ink discharge openings is arranged in the direction crossing the main scanning direction, and ink drop discharge direction is headed below.

As the inkjet recording head constructing the recording head 34, an inkjet recording head which includes a piezoelectric actuator such as a piezoelectric device, a thermal actuator which utilizes phase change due to film boiling of liquid by using an electrothermal conversion device such as a heating resistive element, a memory metal actuator which uses metal phase change due to temperature change, an electrostatic actuator which uses electrostatic power or the like as a unit for generating energy to discharge the recording ink can be used.

Further, the carriage 33 is provided with a sub tank 35 for each color to supply ink for each color to the recording head 34. The sub tank 35 is supplied and refilled with the recording ink of the present invention from the ink cartridge 201 which is loaded in the ink cartridge loading section 105 via a recording ink supply tube (not illustrated).

Meanwhile, as a paper feeding unit for feeding paper 42 laded on a paper loading section (pressure plate) 41 of the paper feeding tray 103, there are provided a semilunar roller (paper feed roller 143) which separately feed the paper 42 piece by piece from the paper loading section 41 and a separation pad 144 made of a material having a large friction coefficient, which faces the paper feed roller 143. This separation pad 144 is mounted so as to press against the side of the paper feed roller 143.

As a conveyance part to convey the paper 42 fed from this paper feed unit below the recording head 34, a conveyance belt 151 to electrostatically absorb and convey the paper 42, a counter roller 152 to carry the paper 42 fed from the paper feeding section through a guide 145 by sandwiching the paper 42 between the counter roller 152 and the conveyance belt 151, a conveyance guide 153 to change the direction of the paper 42 fed approximately vertically over the paper feeding section at an angle of about 90°, and let the paper 42 be taken along the conveyance belt 151, and an end pressure roller 155 pressed against the side of the conveyance belt 151 by a pressure member 154 are provided. Further, a charging roller 156 which is an electrification measure to charge a surface of the conveyance belt 151 is provided.

The conveyance belt 151 is an endless belt. The conveyance belt 151 is stretched between a conveyance roller 157 and a tension roller 158, and can go around in the belt conveying direction. This conveyance belt 151 has a surface layer formed of a resin material (with no resistance control) having a thickness of about 40 μM, for example, a tetrafluoroethylene-ethylene copolymer (ETFE) and serving as a paper absorbing surface, and a back layer (medium resistance layer, grounding layer) provided with resistance control by carbon, which is the same material as used in the surface layer. A guide member 161 corresponding to a printing region by the recording head 34 is arranged on the rear side of the conveyance belt 151. As a paper ejection part to eject the paper 42 recorded by the recording head 34, a separation claw 171 to separate the paper 42 from the conveyance belt 151, a paper discharging roller 172, and a paper discharging roller 173 are provided, and the paper ejection tray 103 is arranged below the paper ejection roller 172.

A double-sided paper feed unit 181 is detachably loaded on the rear face part of the apparatus body 101. The double-sided paper feed unit 181 takes in the paper 42 returned by backward rotation of the conveyance belt 151, inverts the paper 42, and feeds the paper 42 again between the counter roller 152 and the conveyance belt 151. A manual paper feeding section 182 is provided on the top face of the double-sided paper feeding unit 181.

In this inkjet recording apparatus, the paper 42 is separately fed piece by piece from the paper feeding section. Then, the paper 42 fed approximately vertically over the paper feeding section is guided by the guide 145, and conveyed by being sandwiched between the conveyance belt 151 and the counter roller 152. Further, an end of the paper 42 is guided by the conveyance guide 153, and is pressed onto the conveyance belt 151 by the end pressure roller 155. Then, the conveyance direction of the paper 42 is changed at an angle of about 90°.

At this time, the conveyance belt 157 is charged by the charging roller 156, and therefore, the paper 42 is conveyed in the state where the paper 42 is electrostatically absorbed by the conveyance belt 151. By driving the recording head 34 correspondingly to image signals while moving the carriage 33, ink drops are discharged to the stopped paper 42 and one line is recorded. After the paper 42 is carried in a given amount, the next line is recorded. When a recording finish signal or a signal that a back end of the paper 42 reaches the recording region is received, recording operation is finished, and the paper 42 is discharged to the paper discharging tray 103.

When remaining amount near end of the recording ink inside the sub tank 35 is detected, a necessary amount of the recording ink is resupplied from the ink cartridge 201 to the sub tank 35.

In this inkjet recording device, when the recording ink in the ink cartridge 201 is used up, it is possible to disassemble the housing in the ink cartridge 201 and replace only the interior ink bag. Further, the ink cartridge 201 can supply the recording ink stably even when the ink cartridge 201 is placed vertically and has a front loading construction. Therefore, even when the installation is made in the state where a space over the top face of the device body 101 is blocked off, for example, when the device body 101 is housed in a rack, or objects are laid on the top face of the device body 101, the ink cartridge 201 can be easily replaced.

A configuration example of a subsystem 91 including a maintenance device of an ejecting device for use in the present invention will be explained with reference to FIGS. 6 to 8.

Figure 6:
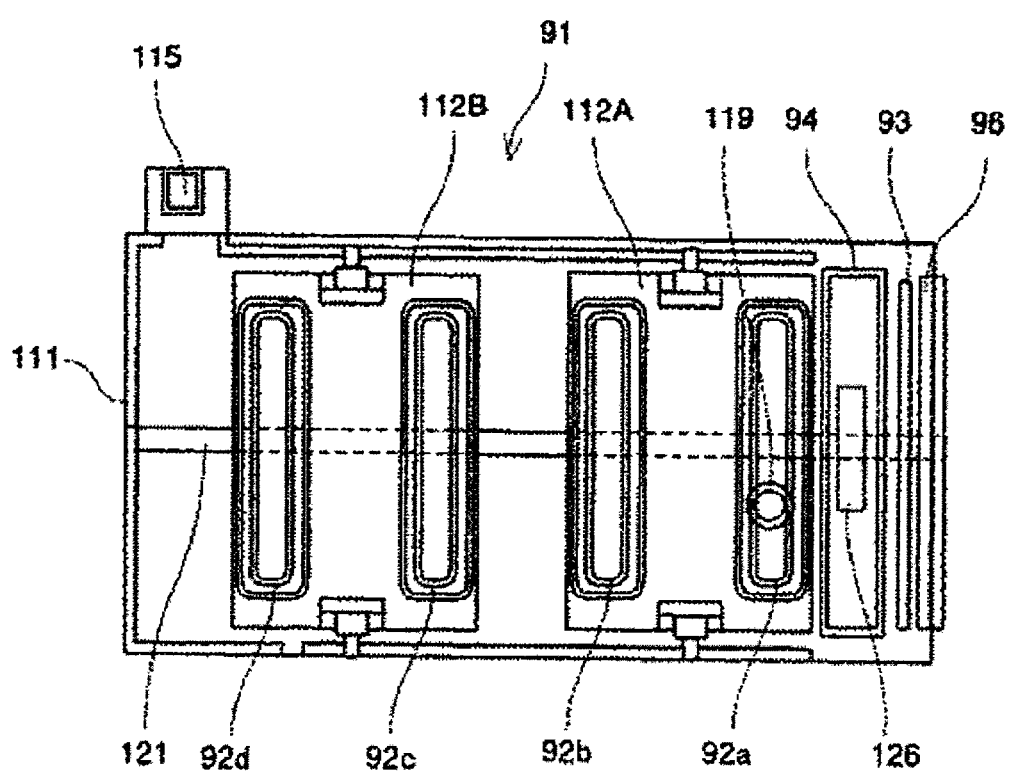
FIG. 6 is a plain explanatory diagram of a main section, illustrating one example of a subsystem including a maintenance device of a jetting device in an inkjet recording device.
Figure 7:
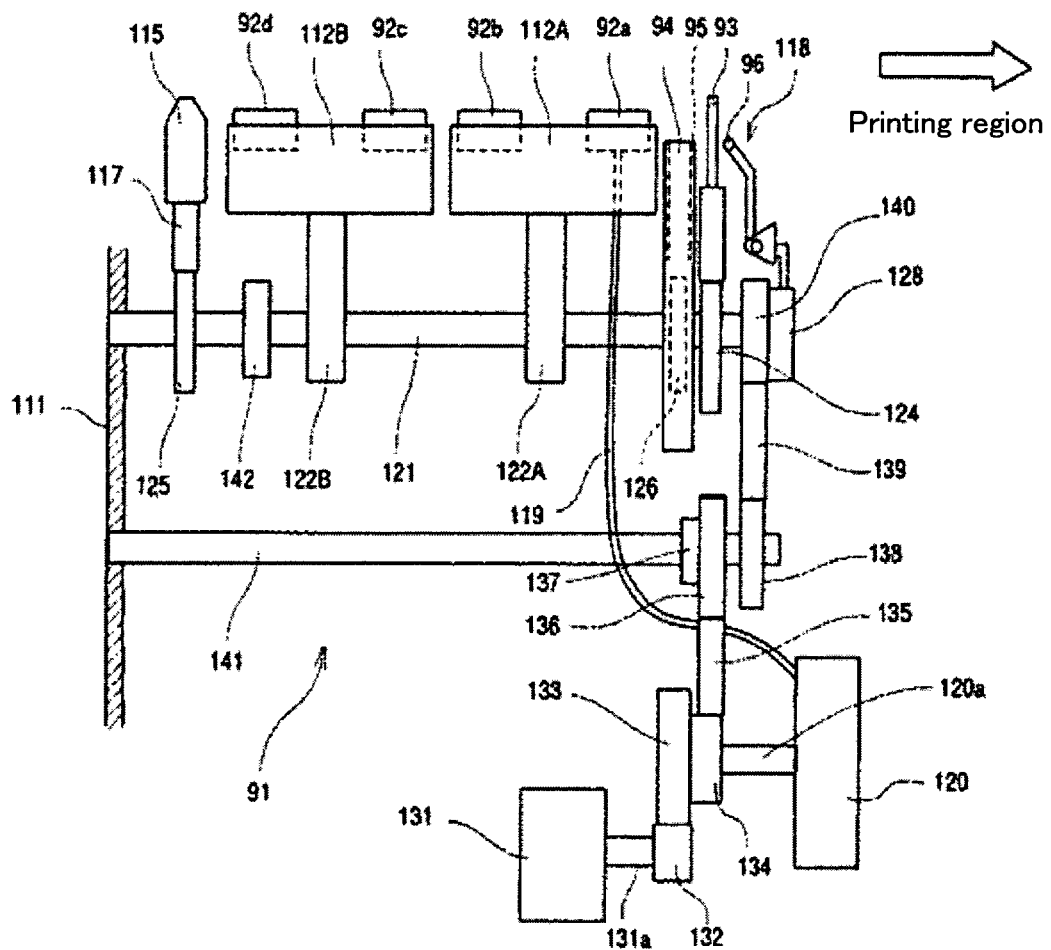
FIG. 7 is a schematic configuration diagram of the subsystem.
Figure 8:
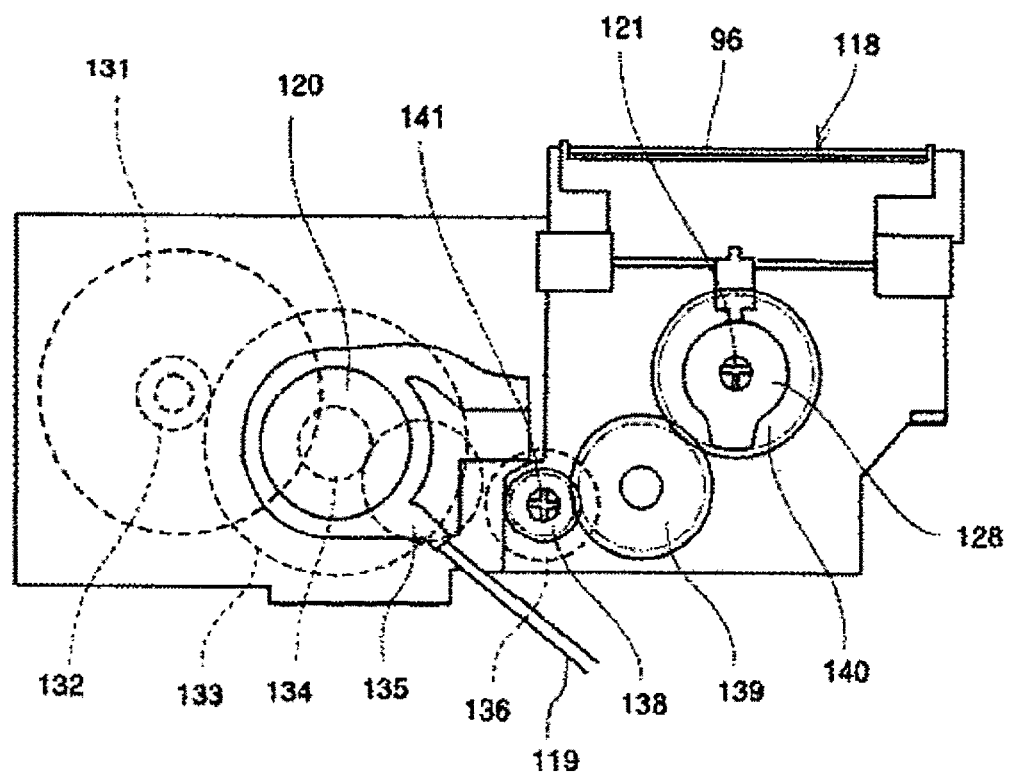
FIG. 8 is an explanatory diagram illustrating the right side of the subsystem.

FIG. 6 is a plain explanatory diagram of a main section, illustrating one example of a subsystem including a maintenance device of a jetting device, FIG. 7 is a schematic configuration diagram of the subsystem, and FIG. 8 is an explanatory diagram illustrating the right side of the system of FIG. 6.

To a frame (maintenance device frame) 111 of this subsystem, two cap holders 112A, 112B serving as a cap holding unit, a wiper blade 93, which is a wiping member containing an elastic material, as a cleaning unit, and a carriage lock 115 are slideably held in the manner that these units can move upwards and downwards.

Moreover, a spitting receiver 94 is provided between the wiper blade 93 and the cap holder 112A, and a wiper cleaner 118 is held in the manner that it can be oscillated for cleaning the wiper blade 93. The wiper cleaner 118 is a cleaning member, and contains a cleaning roller 96, which is a cleaning member configured to press the wiper blade 93 from the outside of the frame 111 to the side of a wiper cleaner 95 that is a cleaning member of the spitting receiver 94.

The cap holders 112A and 112B (may also referred to as "cap holders 112" when each of them does not need to be distinguished) each have two caps 92a and 92b, and 92c and 92d, respectively, which cap nozzle faces of two recording heads.

The cap 92a held by the cap holder 112A, which is the closest to the printing section among the cap holders, is connected to a tubing pump (suction pump) 120 serving as a suctioning unit, via a flexible tube 119, and other caps 92b, 92c, and 92d are not connected to the tubing pump 120. Specifically, only the cap 92a is used as a cap for suctioning (recovering) and moisture retaining (may be simply referred to as "a suction cap" hereinafter), and other caps 92b, 92c, and 92d are each used simply as a cap for moisture retaining.

At the time of a recovery operation of the recording head, therefore, the recording head to which the recovery operation is performed is selectively moved to the position where the recording head to which the recovery operation is performed can be capped with the suction cap 92a.

Moreover, at the bottom of the cap holders 112A and 112B, a cam shaft 121 is provided in the manner that the cam shaft 121 rotatably support the frame 111, and the cam shaft 121 is provided with cap cams 122A and 122B for moving up and down the cap holders 112A and 112B, respectively, a wiper cam 124 for moving up and down the wiper blade 93, a carriage lock cam 125 for sliding the carriage lock 115 via the carriage lock arm 117, and cleaner cams 128 for vibrating a roller 126, and the wiper cleaner 118 are respectively provided, where the roller is a rotating body that is a spitting receiving member by which spitted droplets are received in the spitting receiver 94.

Note that, the caps 92 are moved upwards and downwards by the cap cams 122A, and 122B.

The wiper blade 93 is moved by the wiper cam 124, and the wiper cleaner 118 comes out as the wiper blade 93 goes down. By moving the wiper blade 93 to go down while sandwiched between the cleaner roller 96 of the wiper cleaner 118 and the wiper cleaner 95 of the spitting receiver 94, the ink deposited onto the wiper blade 93 is scraped and dropped into the spitting receiver 94.

The carriage lock 115 is forced upwards (locking direction) by a compression spring, which is not shown in the drawing, and is moved via the carriage lock arm 117 driven by the carriage lock cam 125.

For driving the tubing pump 120 and the cam shaft 121 to rotate, rotating motions of a motor 131 is transferred to a motor gear 132 provided with a motor shaft 131a, the motor gear 132 is engaged with a pump gear 133 provided to the pump shaft 120a of the tubing pump 120, a intermediate gear 134 integrated with the pump gear 133 is engaged with an intermediate gear 136 equipped with a one-way clutch 137 via an intermediate gear 135, and an intermediate gear 138 provided to the same shaft where the intermediate gear 136 is provided is engaged with a cam gear 140 fixed to the cam shaft 121 via an intermediate gear 139.

Note that, an intermediate shaft 141, which is a rotating shaft of the intermediate gear 136 equipped with the clutch 137 and the intermediate gear 138, is rotatably supported to the frame 111.

Moreover, a cam for a home position sensor 142 for detecting a home position is provided to the cam shaft 121, a home position lever (not shown) is operated by a home position sensor, which is not shown in the drawing, provided in the subsystem 91 when the cap 92 is moved to the bottom end, and at this time the sensor becomes open to thereby detect the home position of the motor 131 (other than the pump 120).

Note that, when the power is turned on, the home position sensor 142 moves upwards and downwards regardless of the position of the cap 92 (the cap holder 112), does not detect the position until when it starts moving, and moves to the bottom end to travel for a determined distance after detecting the home position (in the middle of going upwards) of the cap 92.

Thereafter, the carriage is moved back to the capping position after the position detection by moving sideways, and the recording head 34 is capped.

The spitting receiver section will be explained with reference to FIGS. 9 and 10.

Figure 9:
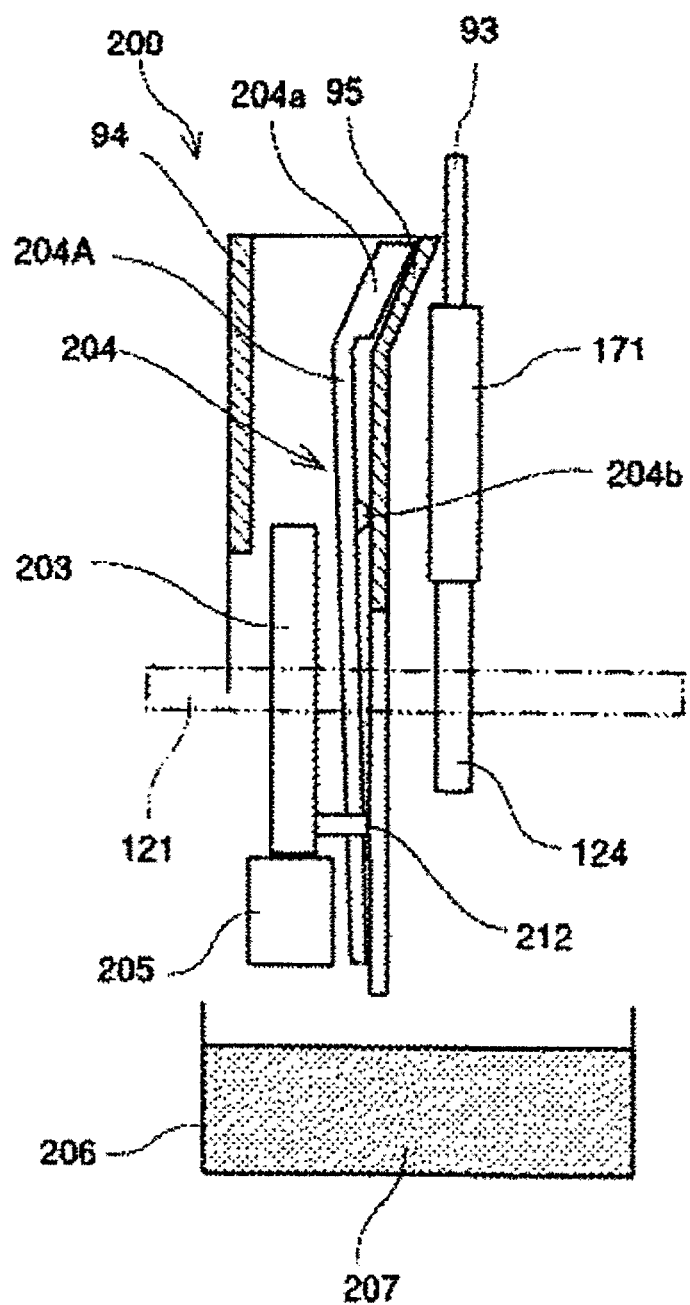
FIG. 9 is a front cross-sectional diagram of one example of a spitting receiver section for use in the inkjet recording device of the present invention.
Figure 10:
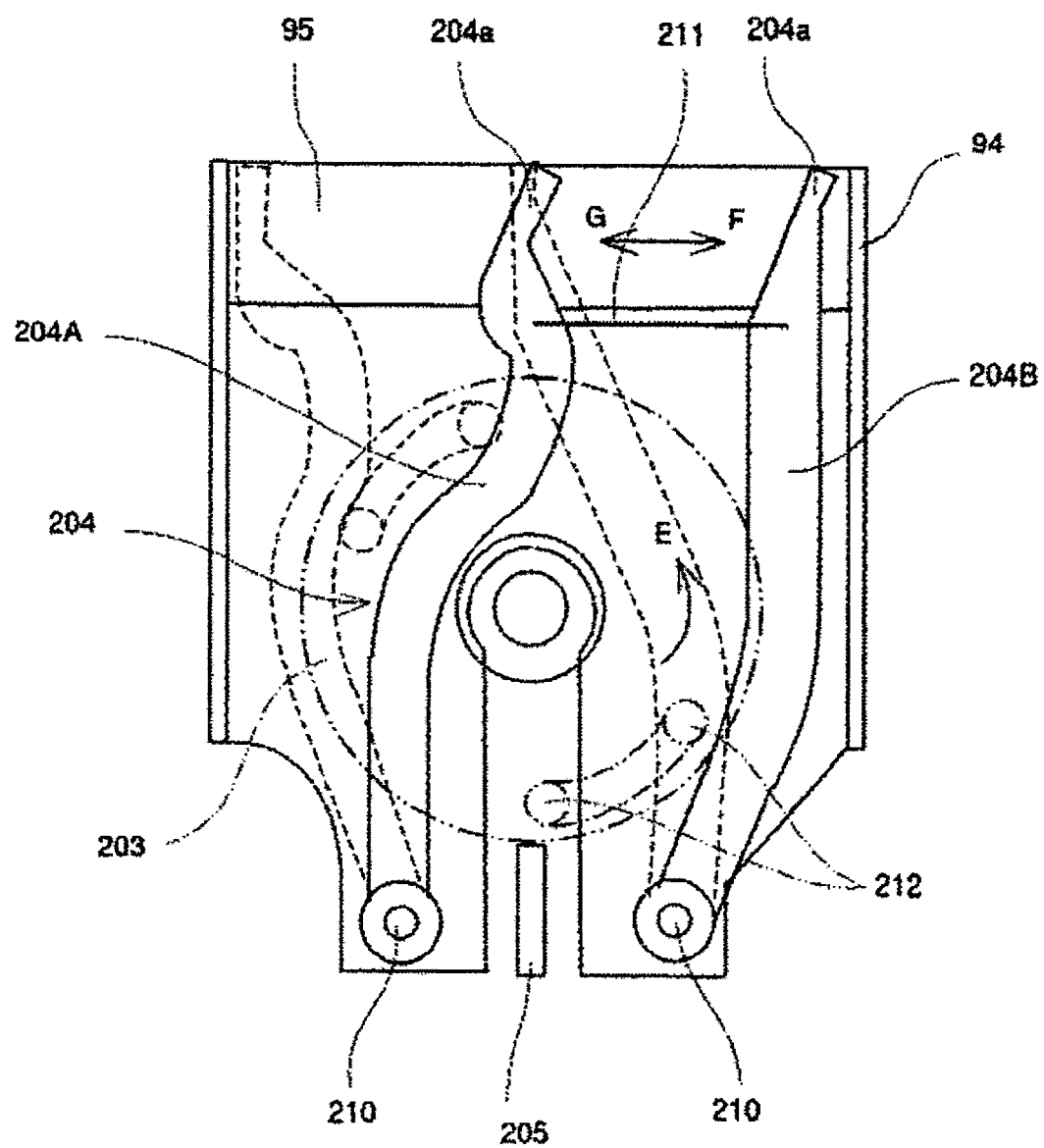
FIG. 10 is a side face explanatory diagram of the spitting receiver section.

FIG. 9 is a front cross-sectional diagram for explaining the spitting receiver section, and FIG. 10 is a side plane diagram for explaining the spitting receiver section.

The spitting receiver section 200 contains: a spitting receiver 94; a roller 203 which is located at the bottom side of the spitting receiver 94, and is a spitting receiving member provided to the cam shaft 121; scraping members 204A and 204B, which constitute a scraping unit 204 for scraping the inkjet ink deposited to the inner surface of the wiper cleaner 95; and scraping member 205 for scraping the inkjet ink deposited to the roller 203 which is a rotating body. Moreover, at the bottom part of the spitting receiver 94, a waste ink tank 206 containing an absorber 207 is provided.

In the scraping unit 204 for scraping the inkjet ink deposited to the inner surface of the wiper cleaner 95 of the spitting receiver 94, the scraping members 204A and 204B are supported to a shaft 210 provided at the bottom edge part of the holder 201 in the manner that the bottom edges of the scraping members 204A and 204B are vibrated by the shaft 210, and the scraping members 204A and 204B are slackly connected to each other with a linking member 211.

Moreover, pin members 212 and 212, which can be brought into contact with the scraping members 204A and 204B by the rotation of the roller 203, is provided at the side of the roller 203, which is the rotating body of the spitting receiving member, provided to the cam shaft 121.

The edge parts 204a of the scraping members 204A and 204B are tilted to correspond to the tilted surface of the wiper cleaner 95.

Moreover, a protrusion 204b is provided at the side facing to the inner wall of the spitting receiver 94 where the scraping members 204A and 204B were provided, for reducing the contact area during the vibration.

As a result of the configuration mentioned above, the inkjet ink removed from the wiper blade 93 is deposited to the wiper cleaner 95 during the cleaning of the wiper blade 93.

As the cam shaft 121, the roller 203 rotates in the direction shown with E in FIG. 10. As the roller 203 rotates in this manner, a pin member 212 is brought into contact with the scraping members 204A and 204B to thereby move the scraping members 204A and 204B sideways in the directions shown with F and G in FIG. 10 (between the position shown with the solid line and the position shown with the dashed line).

By the movements of the scraping members 204A and 204B side ways, the inkjet ink deposited on the wiper cleaner 95 is scraped (collected) into one location or a few locations with tips 204a of the scraping members 204A and 204B, the mass of the inkjet ink becomes large, which moves along the inner wall surface of the spitting receiver 94 with its own weight, followed by falling into the waste ink tank 206 provided below. Specifically, in the case where a wiper cleaning system configured to remove the inkjet ink deposited on the wiper blade 93 by pressing with the wiper cleaner 95, the inkjet ink still remains on the tip of the wiper cleaner 95 after merely pressing and moving wiper blade 93 against the wiper cleaner 95.

Especially when the inkjet ink for use has a high viscosity, the inkjet ink remains on the tip of the wiper cleaner 95, and it may not be able to remove the inkjet ink deposited on the wiper blade 93 at the following cleaning operation.

Therefore, by collecting (putting) the inkjet ink deposited on the wiper cleaner 95 to one or a few locations, the volume of the inkjet droplet relative to the plane in contact with the wiper cleaner 95 becomes big even when the inkjet ink of high viscosity is used, the inkjet ink is easily fallen (flow) from the contact plane with the wiper cleaner 95, and therefore the following cleaning operation of the wiper blade 93 can be performed in the clean state, which improves cleaning performance of the wiper blade 93.

By the experiment conducted, it has been confirmed that when the inkjet ink having the viscosity of 5 mPa·s or higher at 25° C. is used, the inkjet ink is more likely to remain on the tip of the cleaner, and the performance of removing the inkjet ink from the blade reduces from the following cleaning operation.

As a result of providing the scraping members 204A and 204B mentioned above, it has been confirmed that the inkjet ink is effectively made flow down.

In addition, in the scraping system 204, the scraping members 204A and 204B are driven by the rotation of the roller 203 that is a spitting receiving member provided to the cam shaft 121, and therefore the structure thereof is simple.

Moreover, since the roller 203 that is a spitting receiving member rotated by the cam shaft 121 is provided inside the spitting receiver 94, the traveling speed of mist of spitted droplets is slowed down, or the spitted droplets are deposited to and collected by the roller 203. As a result, scattering of the inkjet ink mist is prevented.

Moreover, since the scraping member 205 for scraping the inkjet ink deposited to the roller 203 is provided, the inkjet ink deposited to the roller 203 is scraped by the scraping member 205, and falls down into the waste ink tank 206 by its own weight.

By arranging the member for scraping the inkjet ink deposited to the roller 203 at the bottom side of the roller 203 and above the waste ink receiver (waste ink tank), the inkjet ink deposited to the roller is removed and recycled with a simple structure and at low cost.

Here, descriptions have been given for the case where the present invention is applied to a serial type (shuttle type) inkjet recording device in which carriage performs scanning. However, the present invention can be similarly applied to a line type inkjet recording device provided with a line type head.

The inkjet recording device and inkjet recording method of the present invention can be applied for various recording of inkjet recording system, and are particularly suitably used for an inkjet recording printers, facsimiles, photocopiers, and printer/facsimile/photocopier complex devices.

(Inkjet Recorded Matter)

Recorded matter recorded by means of the inkjet recording device of the invention in accordance with the inkjet recording method of the invention is the inkjet recorded matter of the present invention.

The inkjet recorded matter of the present invention contains a recording medium, and an image formed on the recording medium with the inkjet ink mentioned above.

The recording medium is appropriately selected depending on the intended purpose without any restriction, and examples thereof include plain paper, glossy paper, specialty paper, commonly used printing paper, a cloth, a film, and an OHP sheet. These may be used independently, or in combination.

The inkjet recorded matter has a high quality image without any smearing or blurring, is excellent in stability over time, and can be suitably used in various uses as a document to which various characters and/or images are recorded.

EXAMPLES

Examples of the present invention will be explained hereinafter, but these examples shall not be construed as to limit the scope of the present invention in any way.

Synthesis Example 1

Synthesis of
β-methoxy-N,N-dimethylpropioneamide represented by Structural Formula (I)

A 500 mL-three-necked flask equipped with a stirrer, a thermocouple, and a nitrogen gas inlet tube was charged with 198.0 g (2 mol) of N,N-dimethylacrylamide, and 96 g (3 mol) of methanol.

To this, nitrogen gas was introduced, and 20 mL of a methanol solution containing 1.08 g (0.02 mol) of sodium methoxide was added with stirring at room temperature. The resulting solution gradually increased its temperature and the reaction temperature reached to 38° C. 30 minutes after the start of the reaction. The reaction temperature was controlled to 30° C. to 40° C. using a water bath. Five hours later, the heat evolution of the reaction solution was stopped, and the reaction solution was neutralized with acetic acid. After removing unreacted products by distillation, a generated product was obtained by the distillation at 133 Pa, 58° C. As a result of an analysis of nuclear magnetic resonance spectrum ($^1$H-NMR and $^{13}$C-NMR), it was found that the obtained product was β-methoxy-N,N-dimethylpropioneamide, and the yield thereof was 199 g (yield: 76%).

Preparation Example 1

Preparation of Water-Soluble Polymer Compound Aqueous Solution A

| | |
|---|---|
| α-olefin-maleic anhydride copolymer of the following structural formula (II) (T-YP112, manufactured by SEIKO PMC CORPORATION, olefin chain: C20 to C24, acid value: 190 mgKOH/g, weight average molecular weight: 10,000) | 10.0 parts by mass |

| | |
|---|---|
| 1 N LiOH aqueous solution (1.2 times the among of the acid value of the α-olefin-maleic anhydride copolymer of the following structural formula (II)) | 17.34 parts by mass |
| ion-exchanged water | 72.66 parts by mass |

Structural formula (II)

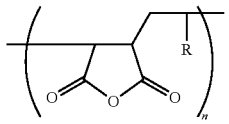

In the structural formula (II) above, R is a C8 to C24 alkyl group, and n is an integer of 10 to 70.

The ingredients above were mixed and the mixture was heated and stirred by a stirrer to dissolve the α-olefin-maleic anhydride copolymer of the structural formula (II), and the resulting solution was filtered through a filter having an average pore diameter of 5 μn to remove a minute amount of insoluble products away, to thereby prepare a water-soluble polymer compound aqueous solution A.

Preparation Example 2

Preparation of Surface-Treated Black Pigment Dispersion Liquid

To 3,000 mL of a 2.5N sodium sulfate solution, 90 g of carbon black having CTAB specific area of 150 m²/g, DBP oil adsorption of 100 mL/100 g was added, and the mixture was stirred at the speed of 300 rpm at the temperature of 60° C. The mixture was allowed to react for 10 hours to perform an oxide treatment.

The resulting reaction liquid was subjected to filtration, and the carbon black removed by the filtration was neutralized with a sodium hydroxide solution, followed by subjecting to ultrafiltration.

The obtained carbon black was washed with water, dried, and then dispersed in pure water to have a solid content of 30% by mass. The dispersion was sufficiently stirred to thereby obtain a black pigment dispersion liquid.

The average particle diameter ($D_{50}$) of the pigment dispersed element in the black pigment dispersion liquid was measured, and it was 103 nm.

Note that, for the measurement of the average particle diameter ($D_{50}$), a particle a particle size analyzer (NANOTRAC UPA-EX150, manufactured by NIKKISO CO., LTD.) was used.

Preparation Example 3

Preparation of Magenta Pigment-Containing Polymer Particle Dispersion Liquid

Preparation of Polymer Solution A

After replacing an inner atmosphere of a 1 L-flask equipped with a mechanical stirrer, the flask was charged with a thermometer, a nitrogen inlet tube, a condensation tube and dropping funnel with nitrogen gas, 11.2 g of styrene, 2.8 g of acrylic acid, 12.0 g of lauryl methacrylate, 4.0 g of polyethylene glycol methacrylate, 4.0 g of styrene micromer, and 0.4 g of mercaptoethanol, and the mixture was heated to 65° C. Next, a mixed solution of 100.8 g of styrene, 25.2 g of acryl acid, 108.0 g of lauryl methacrylate, 36.0 g of polyethylene glycol methacrylate, 60.0 g of hydroxylethyl methacrylate, 36.0 g of styrene macromer, 3.6 g of mercaptoethanol, 2.4 g of azobismethyl valeronitrile, and 18 g of methylethyl ketone was dropped in the flask over 2.5 hours.

After the dropping was completed, a mixture solution of 0.8 g of azobismethyl valeronitrile and 18 g of methylethyl ketone was dropped into the flask over 0.5 hours.

The resulting mixture in the flask was matured at 65° C. for 1 hour, and then 0.8 g of azobismethyl valeronitrile was added, followed by maturing for another 1 hour.

After the completion of the reaction, 364 g of methylethyl ketone was added to the flask, to thereby obtain 800 g of Polymer Solution A having a concentration of 50% by mass.

<Preparation of Pigment-Containing Polymer Particle Dispersion Liquid>

After mixing and sufficiently stirring 28 g of Polymer Solution A, 42 g of C.I. Pigment RED 122, 13.6 g of 1 mol/L potassium hydroxide aqueous solution, 20 g of methylethyl ketone, and 13.6 g of ion-exchanged water, the mixture was kneaded by means of a roll-mill to thereby obtain a paste. The obtained paste was then added to 200 g of pure water, and the mixture was sufficiently stirred. Then, methylethyl ketone and water was removed from the mixture by means of an evaporator, and the resultant was subjected to pressure filtration using a polyvinylidene fluoride membrane filter having an average opening diameter of 5.0 μM to remove coarse particles, to thereby obtain a magenta pigment-containing polymer particle dispersion liquid containing 15% by mass of the pigment and having the solid content of 20% by mass.

An average particle diameter ($D_{50}$) of the polymer particles contained in the obtained magenta pigment-containing polymer particle dispersion liquid was measured, and the average particle diameter ($D_{50}$) thereof was 127 nm.

Note that, for the measurement of the average particle diameter ($D_{50}$), a particle a particle size analyzer (NANOTRAC UPA-EX150, manufactured by NIKKISO CO., LTD.) was used.

Preparation Example 4

Preparation of Cyan Pigment-Containing Polymer Particle Dispersion Liquid

A cyan pigment-containing polymer particle dispersion liquid of Preparation Example 4 was prepared in the same manner as in Preparation Example 3, provided that the pigment for use was changed from C.I. PIGMENT RED 122 to a phthalocyanine pigment (C.I. PIGMENT BLUE 15:3).

The average particle diameter ($D_{50}$) of the polymer particles in the obtained cyan pigment-containing polymer particle dispersion liquid was measured by a particle a particle size analyzer (NANOTRAC UPA-EX150, manufactured by NIKKISO CO., LTD.), and it was 93 nm.

Preparation Example 5

Preparation of Yellow Pigment-Containing Polymer Particle Dispersion Liquid

A yellow pigment-containing polymer particle dispersion liquid of Preparation Example 5 was prepared in the same manner as in Preparation Example 3, provided that the pigment for use was changed from C.I. PIGMENT RED 122 to a monoazo yellow pigment (C.I. PIGMENT YELLOW 74).

The average particle diameter ($D_{50}$) of the polymer particles in the obtained yellow pigment-containing polymer particle dispersion liquid was measured by a particle a particle size analyzer (NANOTRAC UPA-EX150, manufactured by NIKKISO CO., LTD.), and it was 76 nm.

Preparation Example 6

Preparation of Carbon Black Pigment-Containing Polymer Particle Dispersion Liquid A carbon black pigment-containing polymer particle dispersion liquid of Preparation Example 6 was prepared in the same manner as in Preparation Example 3, provided that the pigment for use was changed from C.I. PIGMENT RED 122 to carbon black (FW100, manufactured by EVONIK DEGUSSA JAPAN CO. LTD.).

The average particle diameter ($D_{50}$) of the polymer particles in the obtained carbon black pigment-containing polymer particle dispersion was measured by a particle a particle size analyzer (NANOTRAC UPA-EX150, manufactured by NIKKISO CO., LTD.), and it was 104 nm.

Preparation Example 7

Preparation of Yellow Pigment Surfactant Dispersion Liquid

| | |
|---|---|
| monoazo yellow pigment (C.I. PIGMENT YELLOW 74, manufactured by Dainichiseika Color & Chemicals Mfg. Co., Ltd.) | 30.0 parts by mass |
| polyoxyethylene styrene phenyl ether (nonionic surfactant, NOIGEN EA-177, manufactured by DAI-ICHI KOGYO SEIYAKU CO., LTD., HLB number: 15.7) | 10.0 parts by mass |
| ion-exchanged water | 60.0 parts by mass |

At first, the surfactant above was made dissolved in the ion-exchanged water, and to this the pigment above was mixed and the pigment was sufficiently wet, and then the mixture was dispersed by a wet disperser (DYNO MILL KDL A-type, manufactured by WILLY A. BACHOFEN AG MASCHINENFABRIK) filled with zirconia beads having a diameter of 0.5 mm for 2 hours at 2,000 rpm to thereby obtain a primary pigment dispersion.

Next, to the primary pigment dispersion 4.26 parts by mass of a water-soluble polyurethane resin (TAKELAC W-5661, manufactured by Mitsui Chemicals, Inc., active principle: 35.2% by mass, acid value: 40 mgKOH/g, molecular weight: 18,000) was added as a water-soluble polymer compound aqueous solution, and the mixture was sufficiently stirred to thereby obtain a yellow pigment surfactant dispersion liquid.

The average particle diameter ($D_{50}$) of the pigment dispersed element in the obtained yellow pigment surfactant dispersion liquid was measured and it was 62 nm.

Note that, for the measurement of the average particle diameter ($D_{50}$), a particle a particle size analyzer (NANOTRAC UPA-EX150, manufactured by NIKKISO CO., LTD.) was used.

Preparation Example 8

Preparation of Magenta Pigment Surfactant Dispersion Liquid

| | |
|---|---|
| quinacridon pigment (C.I. PIGMENT RED122, manufactured by Dainichiseika Color & Chemicals Mfg. Co., Ltd.) | 30.0 parts by mass |
| polyoxyethylene-β-naphthylether (nonionic surfactant, RT-100, manufactured by TAKEMOTO OIL & FAT CO., LTD., HLB number: 18.5) | 10.0 parts by mass |
| ion-exchanged water | 60.0 parts by mass |

At first, the surfactant above was made dissolved in the ion-exchanged water, and to this the pigment above was mixed and the pigment was sufficiently wet, and then the mixture was dispersed by a wet disperser (DYNO MILL KDL A-type, manufactured by WILLY A. BACHOFEN AG MASCHINENFABRIK) filled with zirconia beads having a diameter of 0.5 mm for 2 hours at 2,000 rpm to thereby obtain a primary pigment dispersion.

Next, to the primary pigment dispersion 7.14 parts by mass of a water-soluble styrene-(meth)acryl copolymer (JC-05, manufactured by SEIKO PMC CORPORATION, active principle: 21% by mass, acid value: 170 mgKOH/g, weight average molecular weight: 16,000) was added, and the mixture was sufficiently stirred to thereby obtain a magenta pigment surfactant dispersion liquid.

The average particle diameter ($D_{50}$) of the pigment dispersed element in the obtained magenta pigment surfactant dispersion liquid was measured and it was 83 nm.

Note that, for the measurement of the average particle diameter ($D_{50}$), a particle a particle size analyzer (NANOTRAC UPA-EX150, manufactured by NIKKISO CO., LTD.) was used.

Preparation Example 9

Preparation of Cyan Pigment Surfactant Dispersion Liquid A

| | |
|---|---|
| phthalocyanine pigment (C.I. PIGMENT BLUE 15:3, manufactured by Dainichiseika Color & Chemicals Mfg. Co., Ltd.) | 30.0 parts by mass |
| polyoxyethylenestyrenephenylether (nonionic surfactant, NOIGEN EA-177, manufactured by DAI-ICHI KOGYO SEIYAKU CO., LTD., HLB number: 15.7) | 10.0 parts by mass |
| ion-exchanged water | 60.0 parts by mass |

At first, the surfactant above was made dissolved in the ion-exchanged water, and to this the pigment above was mixed and the pigment was sufficiently wet, and then the mixture was dispersed by a wet disperser (DYNO MILL KDL A-type, manufactured by WILLY A. BACHOFEN AG MASCHINENFABRIK) filled with zirconia beads having a diameter of 0.5 mm for 2 hours at 2,000 rpm to thereby obtain a primary pigment dispersion.

Next, to the primary pigment dispersion 7.51 parts by mass of the water-soluble polymer compound aqueous solution A of Preparation Example 1 and 2.51 parts by mass of (NICHIGO POLYESTER W-0030, manufactured by Nippon Synthetic Chemical Industry Co., Ltd., active principle: 29.9% by mass, acid value: 100 mgKOH/g, weight average molecular weight: 7,000) were added, and the mixture was sufficiently stirred to thereby obtain a cyan pigment surfactant dispersion liquid A.

The average particle diameter ($D_{50}$) of the pigment dispersed element in the obtained cyan pigment surfactant dispersion liquid was measured and it was 78 nm.

Note that, for the measurement of the average particle diameter ($D_{50}$), a particle a particle size analyzer (NANOTRAC UPA-EX150, manufactured by NIKKISO CO., LTD.) was used.

Examples 1 to 13 and Comparative Examples 1 to 4

Preparation of Inkjet Ink

Each inkjet ink was produced in the following manner.

At first, the wetting agent, the penetrating agent, the surfactant, the fungicide and water listed in Tables 1-1 to 1-4 were mixed, and mixture was stirred for 1 hour to thereby uniformly mix.

To this mixture, the water-dispersible resin was added and stirred for 1 hour, and then the pigment dispersion liquid and the defoaming agent were further added and stirred for 1 hour.

The resulting dispersion liquid was subjected to pressure filtration using a polyvinlidene fluoride membrane filter having the average pore diameter of 0.8 μm to remove coarse particles and dust away, to thereby prepare each inkjet ink of Examples 1 to 13 and Comparative Examples 1 to 4.

TABLE 1-1

| | Components (% by mass) | Ex. 1 | Ex. 2 | Ex. 3 | Ex. 4 |
|---|---|---|---|---|---|
| Pigment dispersion liquid | Surface-treated black pigment dispersion liquid (Preparation Example 2) | — | — | — | — |
| | Magenta pigment-containing polymer particle dispersion liquid (Preparation Example 3) | 53.33 | 53.33 | — | — |
| | Cyan pigment-containing polymer particle dispersion liquid (Preparation Example 4) | — | — | 33.33 | 33.33 |
| | Yellow pigment-containing polymer particle dispersion liquid (Preparation Example 5) | — | — | — | — |
| | Black pigment-containing polymer particle dispersion liquid (Preparation Example 6) | — | — | — | — |
| | Yellow pigment surfactant dispersion liquid (Preparation Example 7) | — | — | — | — |
| | Magenta pigment surfactant dispersion liquid (Preparation Example 8) | — | — | — | — |
| | Cyan pigment surfactant dispersion liquid (Preparation Example 9) | — | — | — | — |
| Water-dispersible resin | Acryl-silicone resin emulsion | — | — | — | — |
| | Polyurethane emulsion | — | — | — | — |
| Wetting agent | Amide compound of Structural formula (I) | 10.00 | 5.00 | 20.00 | 50.00 |
| | 1,3-butanediol | 20.00 | 22.50 | 20.00 | — |
| | 3-methyl-1,3-butanediol | — | — | — | — |
| | Glycerin | 10.00 | 12.50 | 10.00 | 5.00 |
| | Propylene glycol | — | — | — | — |
| | 1,2,4-butanetriol | — | — | — | — |
| Penetrating agent | 2-ethyl-1,3-hexanediol | 2.00 | 2.00 | 2.00 | 2.00 |
| | 2,2,4-trimethyl-1,3-pentanediol | — | — | — | — |
| Surfactant | KF-643 | — | — | — | — |
| | ZONYL FS-300 | 2.5 | 2.5 | 1.25 | 1.25 |
| | SOFTANOL EP-7025 | — | — | — | — |
| Fungicide | Proxel GXL | 0.05 | 0.05 | 0.05 | 0.05 |
| Defoaming agent | Silicone defoaming agent KM-72F | 0.10 | 0.10 | 0.10 | 0.10 |
| pH regulator | 2-amino-2-ethyl-1,3-propane diol | 0.3 | 0.3 | 0.3 | 0.3 |
| Pure water | | balance | balance | balance | balance |
| Total (% by mass) | | 100 | 100 | 100 | 100 |

TABLE 1-2

| Components (% by mass) | | Ex. 5 | Ex. 6 | Ex. 7 | Ex. 8 |
|---|---|---|---|---|---|
| Pigment dispersion liquid | Surface-treated black pigment dispersion liquid (Preparation Example 2) | — | — | 30.00 | — |
| | Magenta pigment-containing polymer particle dispersion liquid (Preparation Example 3) | — | — | — | — |
| | Cyan pigment-containing polymer particle dispersion liquid (Preparation Example 4) | — | — | — | — |
| | Yellow pigment-containing polymer particle dispersion liquid (Preparation Example 5) | 33.33 | — | — | — |
| | Black pigment-containing polymer particle dispersion liquid (Preparation Example 6) | — | 53.33 | — | — |
| | Yellow pigment surfactant dispersion liquid (Preparation Example 7) | — | — | — | 13.90 |
| | Magenta pigment surfactant dispersion liquid (Preparation Example 8) | — | — | — | — |
| | Cyan pigment surfactant dispersion liquid (Preparation Example 9) | — | — | — | — |
| Water-dispersible resin | Acryl-silicone resin emulsion | — | — | — | 5.38 |
| | Polyurethane emulsion | — | — | 4.44 | — |
| Wetting agent | Amide compound of Structural formula (I) | 20.00 | 10.00 | 5.00 | 15.00 |
| | 1,3-butanediol | 20.00 | — | — | 12.50 |
| | 3-methyl-1,3-butanediol | — | 15.00 | 15.00 | — |
| | Glycerin | 10.00 | 15.00 | 15.00 | 15.00 |
| | Propylene glycol | — | — | — | — |
| | 1,2,4-butanetriol | — | — | 2.00 | — |
| Penetrating agent | 2-ethyl-1,3-hexanediol | 2.00 | — | 1.00 | 2.00 |
| | 2,2,4-trimethyl-1,3-pentanediol | — | 2.00 | 1.00 | — |
| Surfactant | KF-643 | — | — | 1.00 | 1.00 |
| | ZONYL FS-300 | 1.25 | 1.25 | — | — |
| | SOFTANOL EP-7025 | — | — | — | — |
| Fungicide | Proxel GXL | 0.05 | 0.05 | 0.05 | 0.05 |
| Defoaming agent | Silicone defoaming agent KM-72F | 0.10 | 0.10 | 0.10 | 0.10 |
| pH regulator | 2-amino-2-ethyl-1,3-propanediol | 0.3 | 0.3 | 0.3 | 0.3 |
| Pure water | | balance | balance | balance | balance |
| Total (% by mass) | | 100 | 100 | 100 | 100 |

TABLE 1-3

| Components (% by mass) | | Ex. 9 | Ex. 10 | Ex. 11 | Ex. 12 | Ex. 13 |
|---|---|---|---|---|---|---|
| Pigment dispersion liquid | Surface-treated black pigment dispersion liquid (Preparation Example 2) | — | — | — | 30.00 | — |
| | Magenta pigment-containing polymer particle dispersion liquid (Preparation Example 3) | — | — | — | — | — |
| | Cyan pigment-containing polymer particle dispersion liquid (Preparation Example 4) | — | — | — | — | 33.33 |
| | Yellow pigment-containing polymer particle dispersion liquid (Preparation Example 5) | — | — | — | — | — |
| | Black pigment-containing polymer particle dispersion liquid (Preparation Example 6) | — | — | — | — | — |
| | Yellow pigment surfactant dispersion liquid (Preparation Example 7) | — | — | — | — | — |
| | Magenta pigment surfactant dispersion liquid (Preparation Example 8) | 28.57 | — | — | — | — |

TABLE 1-3-continued

| | Components (% by mass) | Ex. 9 | Ex. 10 | Ex. 11 | Ex. 12 | Ex. 13 |
|---|---|---|---|---|---|---|
| | Cyan pigment surfactant dispersion liquid (Preparation Example 9) | — | 14.67 | 14.67 | — | — |
| Water-dispersible resin | Acryl-silicone resin emulsion | 5.38 | 5.38 | — | — | — |
| | Polyurethane emulsion | — | — | 4.44 | 4.44 | — |
| Wetting agent | Amide compound of Structural formula (I) | 15.00 | 15.00 | 20.00 | 0.50 | 55.00 |
| | 1,3-butanediol | 12.50 | 12.50 | 10.00 | — | — |
| | 3-methyl-1,3-butanediol | — | — | — | 15.00 | — |
| | Glycerin | 10.00 | 15.00 | 10.00 | 15.00 | 5.00 |
| | Propylene glycol | — | — | — | — | — |
| | 1,2,4-butanetriol | — | — | — | 2.00 | — |
| Penetrating agent | 2-ethyl-1,3-hexanediol | 2.00 | 2.00 | 1.00 | 1.00 | 2.00 |
| | 2,2,4-trimethyl-1,3-pentanediol | — | — | 1.00 | 1.00 | — |
| Surfactant | KF-643 | 1.00 | 1.00 | — | 1.00 | — |
| | ZONYL FS-300 | — | — | — | — | 1.25 |
| | SOFTANOL EP-7025 | — | — | 0.50 | — | — |
| Fungicide | Proxel GXL | 0.05 | 0.05 | 0.05 | 0.05 | 0.05 |
| Defoaming agent | Silicone defoaming agent KM-72F | 0.10 | 0.10 | 0.10 | 0.10 | 0.10 |
| pH regulator | 2-amino-2-ethyl-1,3-propanediol | 0.3 | 0.3 | 0.3 | 0.3 | 0.3 |
| | Pure water | balance | balance | balance | balance | balance |
| | Total (% by mass) | 100 | 100 | 100 | 100 | 100 |

TABLE 1-4

| | Components (% by mass) | Comp. Ex. 1 | Comp. Ex. 2 | Comp. Ex. 3 | Comp. Ex. 4 |
|---|---|---|---|---|---|
| Pigment dispersion liquid | Surface-treated black pigment dispersion liquid (Preparation Example 2) | 26.67 | — | 30.00 | — |
| | Magenta pigment-containing polymer particle dispersion liquid (Preparation Example 3) | — | 53.33 | — | — |
| | Cyan pigment-containing polymer particle dispersion liquid (Preparation Example 4) | — | — | — | — |
| | Yellow pigment-containing polymer particle dispersion liquid (Preparation Example 5) | — | — | — | — |
| | Black pigment-containing polymer particle dispersion liquid (Preparation Example 6) | — | — | — | 55.33 |
| | Yellow pigment surfactant dispersion liquid (Preparation Example 7) | — | — | — | — |
| | Magenta pigment surfactant dispersion liquid (Preparation Example 8) | — | — | — | — |
| | Cyan pigment surfactant dispersion liquid (Preparation Example 9) | — | — | — | — |
| Water-dispersible resin | Acryl-silicone resin emulsion | 13.44 | — | 13.44 | — |
| | Polyurethane emulsion | — | — | — | — |
| Wetting agent | Amide compound of Structural formula (I) | — | — | — | — |
| | 1,3-butanediol | — | — | — | — |
| | 3-methyl-1,3-butanediol | 20.00 | 10.00 | 15.00 | 25.00 |
| | Glycerin | 10.00 | — | — | 10.00 |
| | Propylene glycol | — | 20.00 | — | — |
| | 1,2,4-butanetriol | — | 10.00 | 15.00 | — |
| Penetrating agent | 2-ethyl-1,3-hexanediol | — | — | 1.00 | — |
| | 2,2,4-trimethyl-1,3-pentanediol | — | — | — | 2.00 |
| Surfactant | KF-643 | — | — | — | — |
| | ZONYL FS-300 | — | — | 1.25 | 1.25 |
| | SOFTANOL EP-7025 | — | 0.50 | — | — |
| Fungicide | Proxel GXL | 0.05 | 0.05 | 0.05 | 0.05 |
| Defoaming agent | Silicone defoaming agent KM-72F | 0.10 | 0.10 | 0.10 | 0.10 |

TABLE 1-4-continued

| Components (% by mass) | | Comp. Ex. 1 | Comp. Ex. 2 | Comp. Ex. 3 | Comp. Ex. 4 |
|---|---|---|---|---|---|
| pH regulator | 2-amino-2-ethyl-1,3-propanediol | 0.3 | 0.3 | 0 | 0.3 |
| Pure water | | balance | balance | balance | balance |
| Total (% by mass) | | 100 | 100 | 100 | 100 |

The abbreviations shown in Tables 1-1 to 1-4 represent the following meanings:

*acryl-silicone resin emulsion: POLYZOL ROY6312, manufactured by SHOWA DENKO K.K., having a solid content of 37.2% by mass, average particle diameter of 171 nm, and minimum film forming temperature (MFT) of 20° C.

*polyurethane emulsion: HYDRAN APX-101H, manufactured by DIC Corporation, having a solid content of 45% by mass, average particle diameter of 160 nm, minimum film forming temperature of 20° C.

*KF-643: polyether-modified silicone compound (manufactured by Shin-Etsu Chemical Co., Ltd., active principle content of 100% by mass)

*ZONYL FS-300: polyoxyethylene perfluoroalkyl ether (manufactured by Du Pont Kabushiki Kaisha, active principle content of 40% by mass)

*SOFTANOL EP-7025: polyoxyalkylene alkyl ether (manufactured by Nippon Shokubai Co., Ltd., active principle content of 100% by mass)

*Proxel GXL: fungicide containing 1,2-benzisothiazolin-3-one as a main component (manufactured by Arch Chemicals, Inc., active principle content of 20% by mass, containing dipropylene glycol)

*KM-72F: self-emulsifying silicone defoaming agent (manufactured by Shin-Etsu Chemical Co., Ltd., component content of 100% by mass)

Each ink of Examples 1 to 13 and Comparative Examples 1 to 4 was evaluated in the evaluation methods explained below. The results are shown in Tables 2, 3-1, and 3-2.

<Amount of Wetting Agent>

The amount of the wetting agent shown in Table 2 was the amount expressed by percent (%) by mass and that was sum of the amount of the wetting agent and amount of the penetrating agent shown in Tables 1-1 to 1-4.

<Measurement of Viscosity of Ink>

The viscosity of the ink was measured at 25° C. by means of a viscometer (RE-80L, manufactured by Toki Sangyo Co., Ltd.).

<Measurement of Surface Tension of Ink>

The surface tension of the ink was measured at 25° C. by means of an automatic surface tensiometer (CBVP-Z, Kyowa Interface Science Co., Ltd.).

<Measurement of pH of Ink>

The pH value of the ink was measured at 25° C. by means of a pH meter HM-30R (manufactured by TOA-DKK CORPORATION).

—Preparation I of Printing Evaluation—

The inkjet printer (IPSiO GXe5500, manufactured by Ricoh Company Limited) was set to deposit the same amount of the ink on My Paper (manufactured by Ricoh Company Limited) by varying the driving voltage of a piezo element to eject the same amount of the ink under the adjusted environment of 28° C.±0.5° C., and 15% RH±5% RH.

<Ejecting Stability>

A chart in which a solid image having an area of 5% of A4 size paper per color prepared by Microsoft Word 2000 (manufactured by Microsoft Corporation) was printed on My Paper (manufactured by Ricoh Company Limited) for five sets, where one set included continuous printing on 200 pieces of the paper, and ejecting disorder of each nozzle was evaluated based on the output image after the printing.

The printing mode used was a mode in which the mode of "plain paper, standard printing speed" was modified to have "no color correction" through the user setting for plain paper by the driver attached to the printer.

[Evaluation Criteria]

A: no ejecting disorder was observed

B: slight ejecting disorder was observed

C: ejecting disorder, or an area where no jetting was performed was observed

—Preparation II of Printing Evaluation—

The inkjet printer (IPSiO GXe5500, manufactured by Ricoh Company Limited) was set to deposit the same amount of the ink on My Paper (manufactured by Ricoh Company Limited) by varying the driving voltage of a piezo element to eject the same amount of the ink under the adjusted environment of 23° C.±0.5° C., and 50% RH±5% RH.

<Image Density>

A chart in which a 64 point character "■" was formed by Microsoft Word 2000 (manufactured by Microsoft Corporation) was printed on My Paper (manufactured by Ricoh Company Limited), and the color of the area where the character "■" was printed on the printed surface was measured by means of X-Rite939, and evaluated based on the following evaluation criteria.

The printing mode used was a mode in which the mode of "plain paper, standard printing speed" was modified to have "no color correction" through the user setting for plain paper by the driver attached to the printer.

[Evaluation Criteria]

A: 1.2 or more in Black,
0.8 or more in Yellow
1.0 or more in Magenta
1.0 or more in Cyan
B: 1.15 or more but less than 1.2 in Black
0.75 or more but less than 0.8 in Yellow
0.95 or more but less than 1.0 in Magenta
0.95 or more but less than 1.0 in Cyan
C: less than 1.15 in Black
less than 0.75 in Yellow
less than 0.95 in Magenta
less than 0.95 in Cyan <Water Resistance>

In the same manner as in the evaluation for the image density, the chart was printed out on MyPaper (manufactured by Ricoh Company Limited), and the area where the character "■" was printed on the printed surface was dried at the temperature of 23° C., and relative humidity of 50% RH for 24 hours, and then the printed chart was immersed in water of 30° C. for 1 minute, followed by taking out the chart for ventilation drying. The result was evaluated based on the following evaluation criteria.

[Evaluation Criteria]
  A: no bleeding of color
  B: bleeding of color was observed
<Light Resistance>
In the same manner as in the evaluation for the image density, the chart was printed out on MyPaper (manufactured by Ricoh Company Limited), and the area where the character "■" was printed on the printed surface was dried at the temperature of 23° C., and relative humidity of 50% RH for 24 hours. This imaging area was exposed to light that resembled outdoor sunlight from a xenon arc lamp by means of Weather-Ometer® Ci35AW (manufactured by Atlas Material Testing Technology LLC) at the xenon radiation intensity of 0.35 W/m$^2$ (340 nm) for 24 hours in the environment where the temperature, relative humidity, and temperature of the black panel were respectively set to 70° C., 50% RH, and 89° C., and the fading or color change before and after the exposure was evaluated based on the following evaluation criteria.
[Evaluation Criteria]
  A: hardly any change was observed
  B: a change was observed, but it was still under the tolerance limit
  C: significant fading or color change was observed
<Drying Properties>
In the same manner as in the evaluation for the image density, the chart was printed out on MyPaper (manufactured by Ricoh Company Limited), and the area where the character "■" was printed on the printed surface was pressed against filter paper immediately after the printing. The presence of the transferred ink onto the filter paper was evaluated based on the following evaluation criteria.
[Evaluation Criteria]
  A: there was no transferred smear
  B: there was a slight transferred smear
  C: there was a transferred smear
<Ink Depositions in Maintenance Device>
After varying the driving voltage of the piezo element to eject the same amount of the ink with the inkjet printer (IPSiO GXe5500, manufactured by Ricoh Company Limited) under the environment of 28° C.±0.5° C., and 15% RH±5% RH, the head cleaning operation was continuously performed 10 times every hour, and this operation was performed 100 times in total over 10 hours, followed by leaving the inkjet printer to stand for 12 hours. After the 12-hour resting, the ink depositions on the wiper and the wiper cleaner of the maintenance device were visually observed.
[Evaluation Criteria]
  A: no ink deposition was observed
  B: a slight amount of the ink deposition was observed
  C: ink depositions were observed
<Ink Storage Stability>
Using the viscometer mentioned above, the viscosity of the ink was measured before and after storing in a sealed container at 70° C. for 7 days, and the storage stability coefficient was obtained by the following equation from the measured viscosities. The resulted storage stability coefficient was evaluated based on the evaluation criteria listed below.
<Equation>

Ink storage stability (%)=[(viscosity after storage)/(viscosity before storage)]×100

[Evaluation Criteria]
  A: 100%±10% or less
  B: 100%±more than 10% but less than 20%
  C: 100%±20% or more

TABLE 2

| | Physical properties of Ink | | | |
|---|---|---|---|---|
| | Amount of wetting agent (% by mass) | Viscosity (mPa·s) | pH | Surface tension (mN/m) |
| Ex. 1 | 42.0 | 8.92 | 9.5 | 24.1 |
| Ex. 2 | 42.0 | 9.25 | 9.2 | 24.3 |
| Ex. 3 | 52.0 | 10.5 | 9.6 | 25.4 |
| Ex. 4 | 57.0 | 9.49 | 9.9 | 25.2 |
| Ex. 5 | 52.0 | 10.2 | 9.5 | 25.6 |
| Ex. 6 | 42.0 | 10.1 | 9.4 | 25.0 |
| Ex. 7 | 39.0 | 11.4 | 9.2 | 26.1 |
| Ex. 8 | 44.5 | 9.76 | 9.6 | 22.7 |
| Ex. 9 | 39.5 | 10.3 | 9.5 | 22.6 |
| Ex. 10 | 44.5 | 9.83 | 9.6 | 22.2 |
| Ex. 11 | 42.0 | 9.07 | 9.7 | 31.8 |
| Ex. 12 | 34.5 | 11.2 | 9.1 | 26.0 |
| Ex. 13 | 62.0 | 9.85 | 10.0 | 25.3 |
| Comp. Ex. 1 | 30.0 | 7.86 | 9.0 | 37.5 |
| Comp. Ex. 2 | 40.0 | 9.43 | 9.1 | 32.8 |
| Comp. Ex. 3 | 31.0 | 8.44 | 8.2 | 26.4 |
| Comp. Ex. 4 | 37.0 | 11.8 | 9.2 | 25.5 |

TABLE 3-1

| | Jetting stability | Image density | Water resistance | Light resistance |
|---|---|---|---|---|
| Ex. 1 | A | A | A | A |
| Ex. 2 | A | A | A | A |
| Ex. 3 | A | A | A | A |
| Ex. 4 | A | A | A | A |
| Ex. 5 | A | A | A | A |
| Ex. 6 | A | A | A | A |
| Ex. 7 | A | A | A | A |
| Ex. 8 | A | A | A | A |
| Ex. 9 | A | A | A | A |
| Ex. 10 | A | A | A | A |
| Ex. 11 | A | B | A | A |
| Ex. 12 | B | A | A | A |
| Ex. 13 | A | B | A | A |
| Comp. Ex. 1 | C | B | A | A |
| Comp. Ex. 2 | B | C | A | A |
| Comp. Ex. 3 | C | A | A | A |
| Comp. Ex. 4 | B | A | A | A |

TABLE 3-2

| | Drying properties | Ink deposition in maintenance device | Ink storage stability |
|---|---|---|---|
| Ex. 1 | A | A | A |
| Ex. 2 | A | A | A |
| Ex. 3 | A | A | A |
| Ex. 4 | A | A | A |
| Ex. 5 | A | A | A |
| Ex. 6 | A | A | A |
| Ex. 7 | A | A | A |
| Ex. 8 | A | A | A |
| Ex. 9 | A | A | A |
| Ex. 10 | A | A | A |
| Ex. 11 | B | A | A |
| Ex. 12 | A | B | A |
| Ex. 13 | B | A | A |
| Comp. Ex. 1 | C | C | B |

TABLE 3-2-continued

| | Drying properties | Ink deposition in maintenance device | Ink storage stability |
|---|---|---|---|
| Comp. Ex. 2 | B | B | A |
| Comp. Ex. 3 | A | C | C |
| Comp. Ex. 4 | A | C | A |

INDUSTRIAL APPLICABILITY

The present invention provides an inkjet ink that is excellent in image quality on plain paper, especially providing images of high image fastness such as image density, water resistance and light resistance, and excellent in drying speed and response to high-speed printing, has desirable storage stability and jetting stability, and give less load to a maintenance device of an inkjet recording device, as well as providing an ink cartridge, inkjet recording device, inkjet recording method, and inkjet recorded matter using the inkjet ink as mentioned.

Moreover, the inkjet ink of the present invention has excellent stability in jetting from nozzles, enables to form images of high quality, and is suitably used in the ink cartridge, the inkjet recorded matter, the inkjet recording device and the inkjet recording method.

The inkjet recording device and inkjet recording method of the present invention are suitably applied for various recording in an inkjet recording system, and for example, it is particularly suitably applied in an inkjet recording printer, a facsimile device, a photocopying device, a printer/facsimile/copying complex device, and the like.

REFERENCE SIGNS LIST 11 top cover
12 front
15 front cover
31 guide rod
32 stay
33 carriage
34 recording head
35 sub tank
41 paper loading section
42 paper
91 sub system
92 cap
92a suction cap
92b cap
92c cap
92d cap
93 wiper blade
94 spitting receiver
95 wiper cleaner
96 cleaner roller
101 device body
102 paper feeding tray
103 paper discharging tray
104 ink cartridge loading section
105 operation section
111 frame
112 cap holder
112A cap holder
112B cap holder
115 carriage lock
117 carriage lock arm
118 wiper cleaner
119 flexible tube
120 tubing pump (suction pump)
120a pump shaft
121 cam shaft
122A cap cam
122B cap cam
124 wiper cam
125 carriage lock cam
126 spitting receiving member (rotating roller)
128 cleaner cam
131 motor
131a motor
132 motor gear
133 pump gear
134 intermediate gear
135 intermediate gear
136 intermediate gear
137 one way clutch
138 intermediate gear
139 intermediate gear
140 cam gear
141 intermediate shaft
142 cam for home position sensor
143 paper feeding roller
144 separation pad
145 guide
151 conveyance belt
152 counter roller
153 conveyance guide
154 pressure member
155 end pressure roller
156 charging roller
157 conveyance roller
158 tension roller
161 guide member
171 separation claw
172 paper discharging roller
173 paper discharging roller
181 double-sided paper feeding unit
182 manual paper feeding section
200 spitting receiver section
201 ink cartridge
203 spitting receiving member (rotating roller)
204 scraping unit
204A scraping member
204B scraping member
204a tip of scraping member
204b protrusion
205 scraping member
206 waste ink tank
207 absorber
210 shaft
211 linking member
212 pin member
241 ink bag
242 ink inlet
243 ink outlet
244 cartridge case

The invention claimed is:
1. An inkjet ink, comprising:
water;
a wetting agent;
a surfactant; and
a colorant, wherein the wetting agent comprises an amide compound of formula (I):

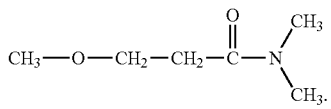

formula (I)

2. The inkjet ink according to claim 1, wherein an amount of the amide compound of formula (I) in the inkjet ink is from 1% by mass to 50% by mass.

3. The inkjet ink according to claim 1, wherein the wetting agent further comprises a polyhydric alcohol having an equilibrium moisture content of 30% by mass or more at 23° C., and 80% RH.

4. The inkjet ink according to claim 3, wherein the polyhydric alcohol is glycerin, 1,3-butanediol, or both glycerin and 1,3-butanediol.

5. The inkjet ink according to claim 1, wherein the colorant comprises:
- a pigment comprising a hydrophilic group on a surface thereof and having water dispersibility without a dispersant;
- a pigment dispersion comprising a pigment, a pigment dispersant, and a polymeric dispersion stabilizer; or
- a polymer emulsion comprising polymer particles, each comprising a pigment.

6. The inkjet ink according to claim 1, further comprising a penetrating agent which comprises a C8-C11 polyol compound or a C8-C11 glycol ether compound.

7. The inkjet ink according to claim 6, wherein the penetrating agent comprises, as a C8-C11 polyol compound, 2-ethyl-1,3-hexanediol or 2,2,4-trimethyl-1,3-pentanediol.

8. The inkjet ink according to claim 1, wherein the inkjet ink has viscosity of from 3 mPa·s to 20 mPa·s at 25° C., a static surface tension of 35 mN/m or less at 25° C., and pH of 8.5 or higher.

9. The inkjet ink according to claim 1, wherein the inkjet ink is at least one selected from the group consisting of a cyan ink, a magenta ink, a yellow ink, and a black ink.

10. The inkjet ink of claim 1, wherein an amount of the water in the inkjet ink is from 20% by mass to 60% by mass.

11. The inkjet ink of claim 2, wherein the amount of the amide compound of formula (I) is from 2% to 40% by mass.

12. The inkjet ink of claim 1, wherein the wetting agent further comprises:
- a wetting agent A having an equilibrium moisture content of 30% by mass or more at 23° C., and 80% RH and a boiling point of 250° C. or higher, and
- a wetting agent B having an equilibrium moisture content of 30% by mass or more at 23° C., and 80% RH and a boiling point of from 140° C. to 250° C.

13. The inkjet ink of claim 12, wherein a mass ratio of the wetting agent A to the wetting agent B is from 10/90 to 90/10.

14. The inkjet ink of claim 1, wherein a content of the wetting agent in the inkjet ink is from 20% by mass to 70% by mass.

15. The inkjet ink of claim 12, wherein the wetting agent further comprises:
- a wetting agent C1 having an equilibrium moisture content of 30% by mass or more at 23° C., and 80% RH and a boiling point of lower than 240° C.

16. The inkjet ink of claim 1, wherein the colorant comprises:
- carbon black,
- a cyan pigment,
- a yellow pigment,
- a magenta pigment,
- a pigment comprising a hydrophilic group on a surface thereof and having water dispersibility without a dispersant, or
- a pigment-containing polymer particle containing a pigment therein.

17. An ink cartridge, comprising:
a container; and
an inkjet ink housed in the container,
wherein the inkjet ink comprises:
water;
a wetting agent;
a surfactant; and
a colorant,
and wherein the wetting agent comprises an amide compound of formula (I):

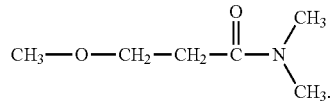

formula (I)

18. An inkjet recording method, comprising:
applying a stimulus to an inkjet ink, thereby recording an image with the inkjet ink, wherein the inkjet ink comprises:
water;
a wetting agent;
a surfactant; and
a colorant,
and wherein the wetting agent comprises an amide compound of formula (I):

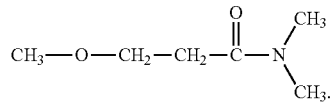

formula (I)

* * * * *